July 24, 1962   A. E. JURS, JR., ET AL   3,045,488
TELEMETERING SYSTEM AND APPARATUS
Filed Aug. 8, 1957   6 Sheets-Sheet 1
FIG_1_
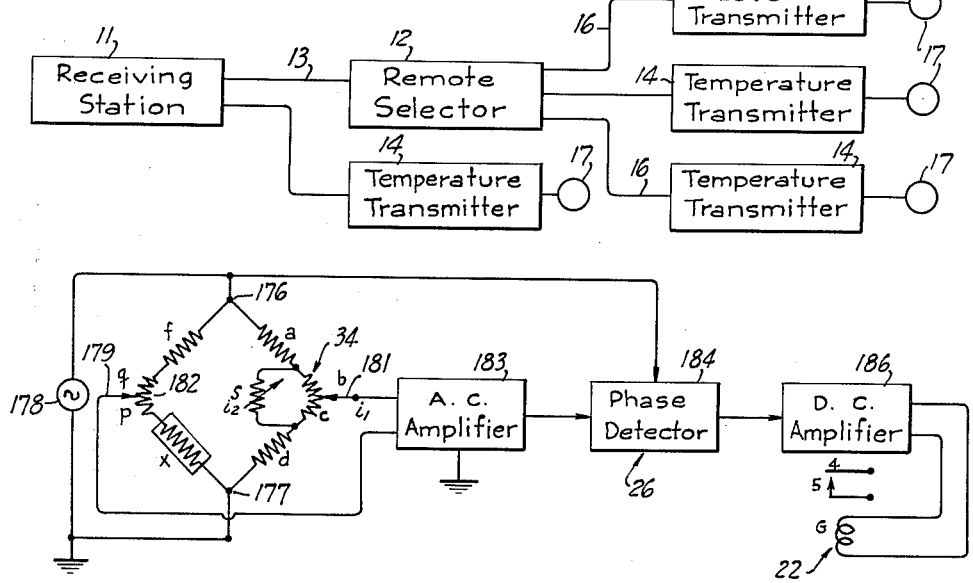
FIG_3_
FIG_2D_
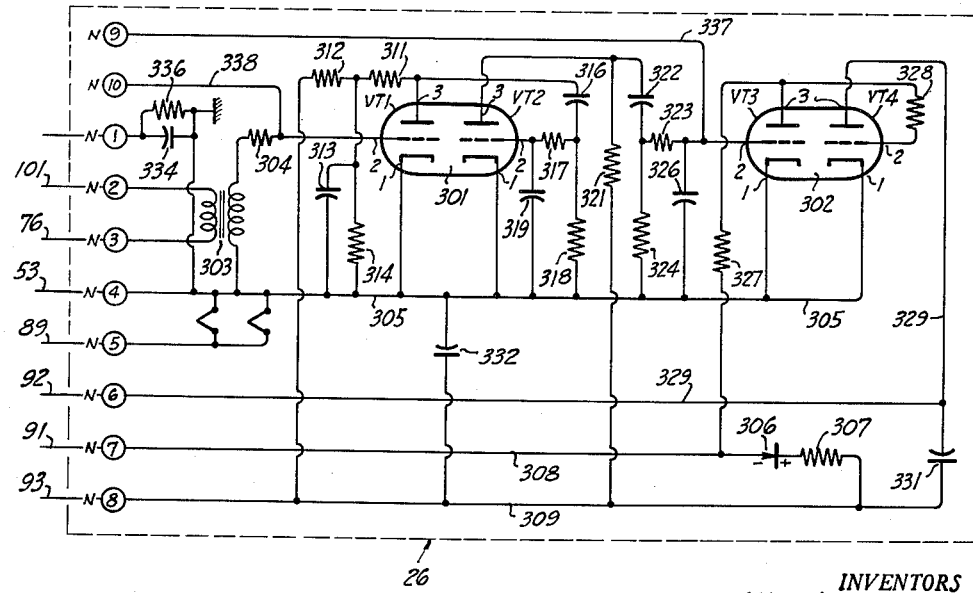
INVENTORS
Albert E. Jurs, Jr.
Theodore E. Veltfort, Jr.
BY
ATTORNEYS

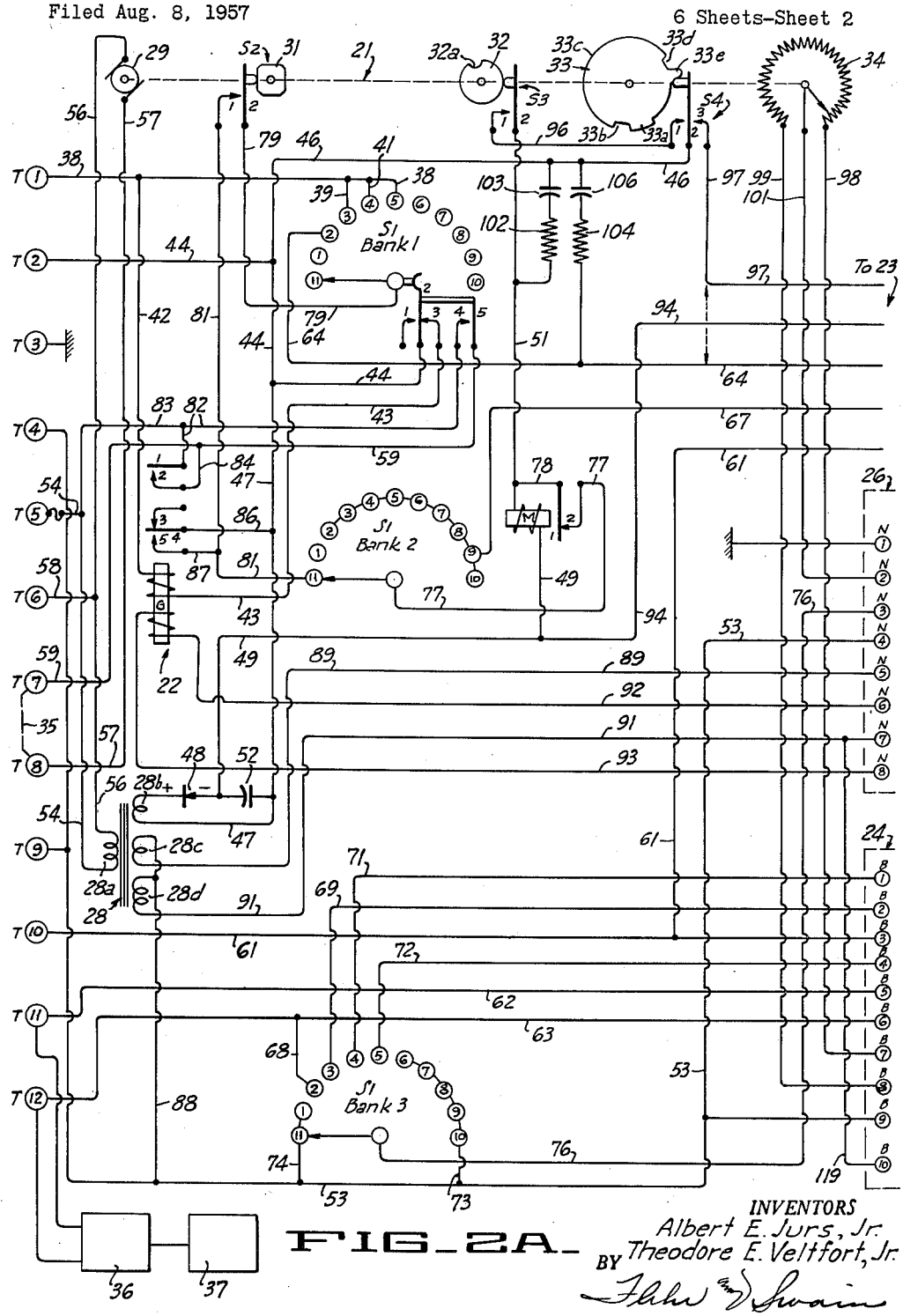

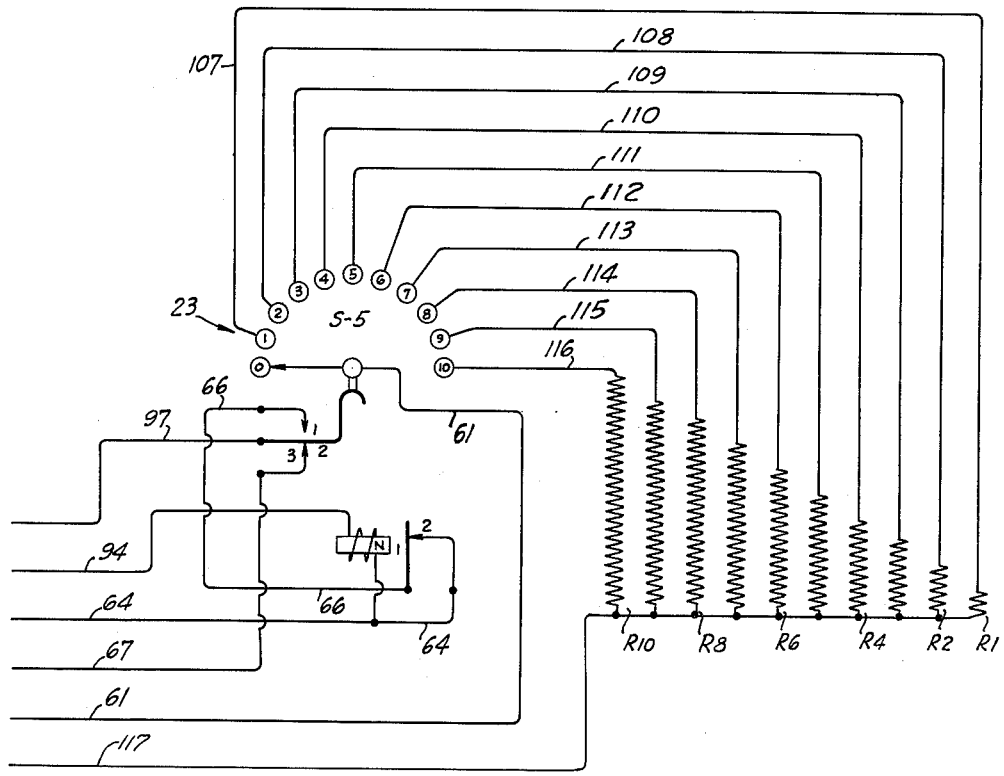
FIG_2B_
FIG_6_
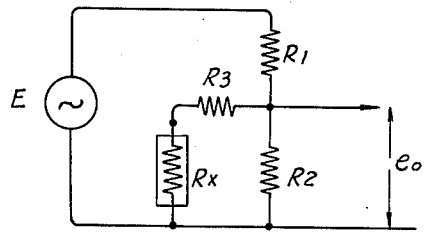

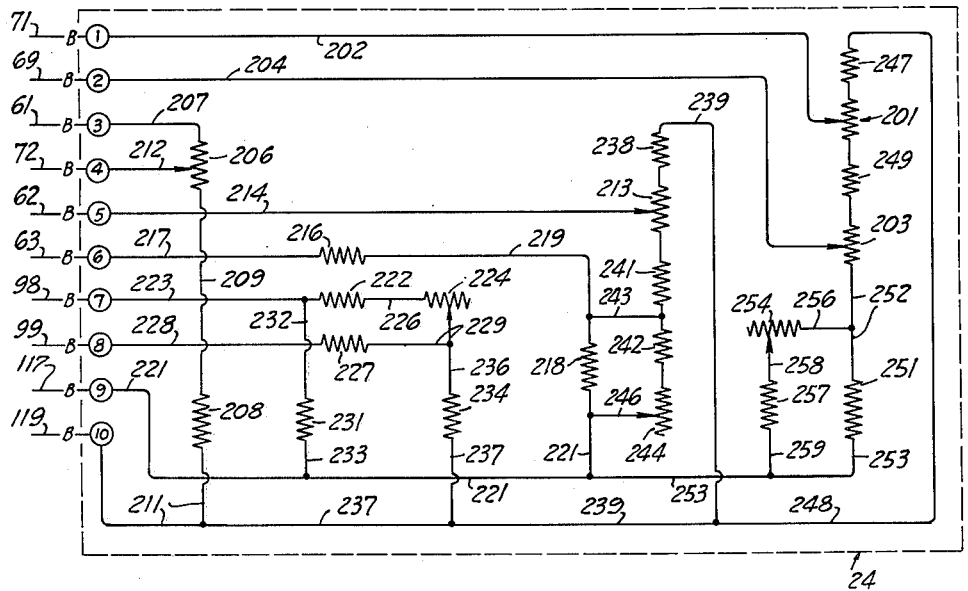
FIG_2C_
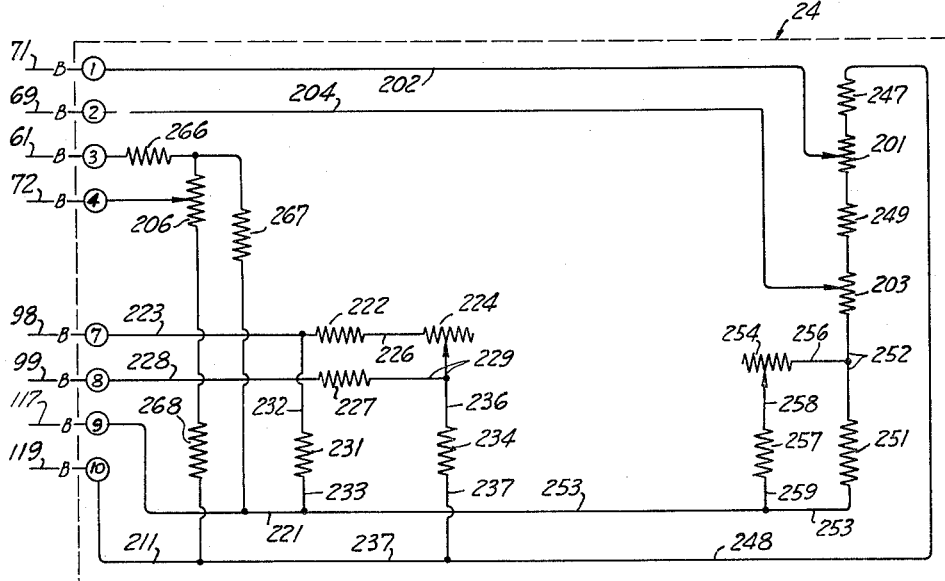
FIG_4_

July 24, 1962  A. E. JURS, JR., ET AL  3,045,488
TELEMETERING SYSTEM AND APPARATUS
Filed Aug. 8, 1957  6 Sheets-Sheet 5
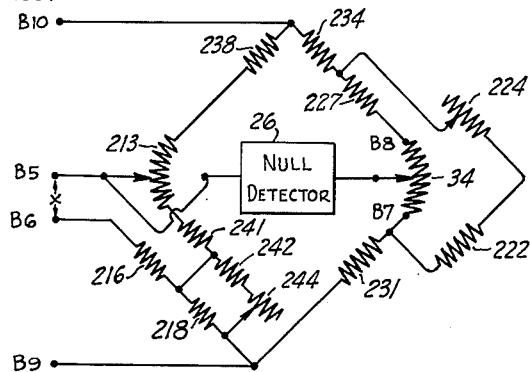
FIG_5A_
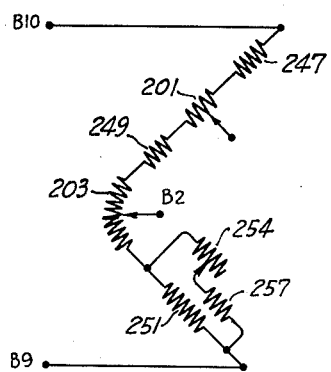
FIG_5B_
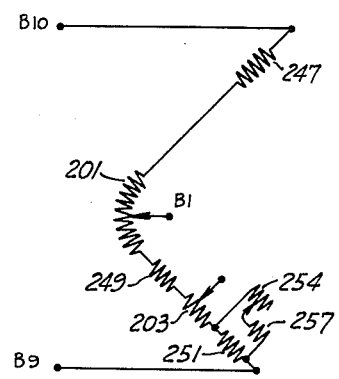
FIG_5C_
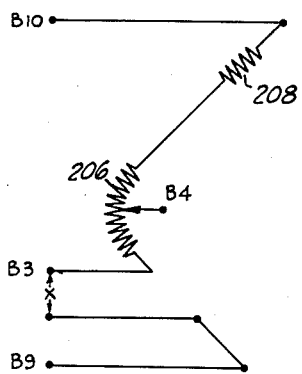
FIG_5D_
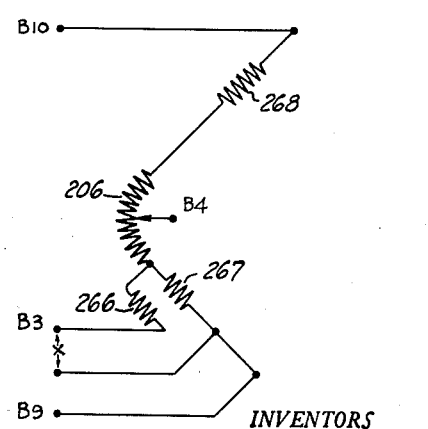
FIG_5E_
INVENTORS
Albert E. Jurs, Jr.
Theodore E. Veltfort, Jr.
BY
ATTORNEYS

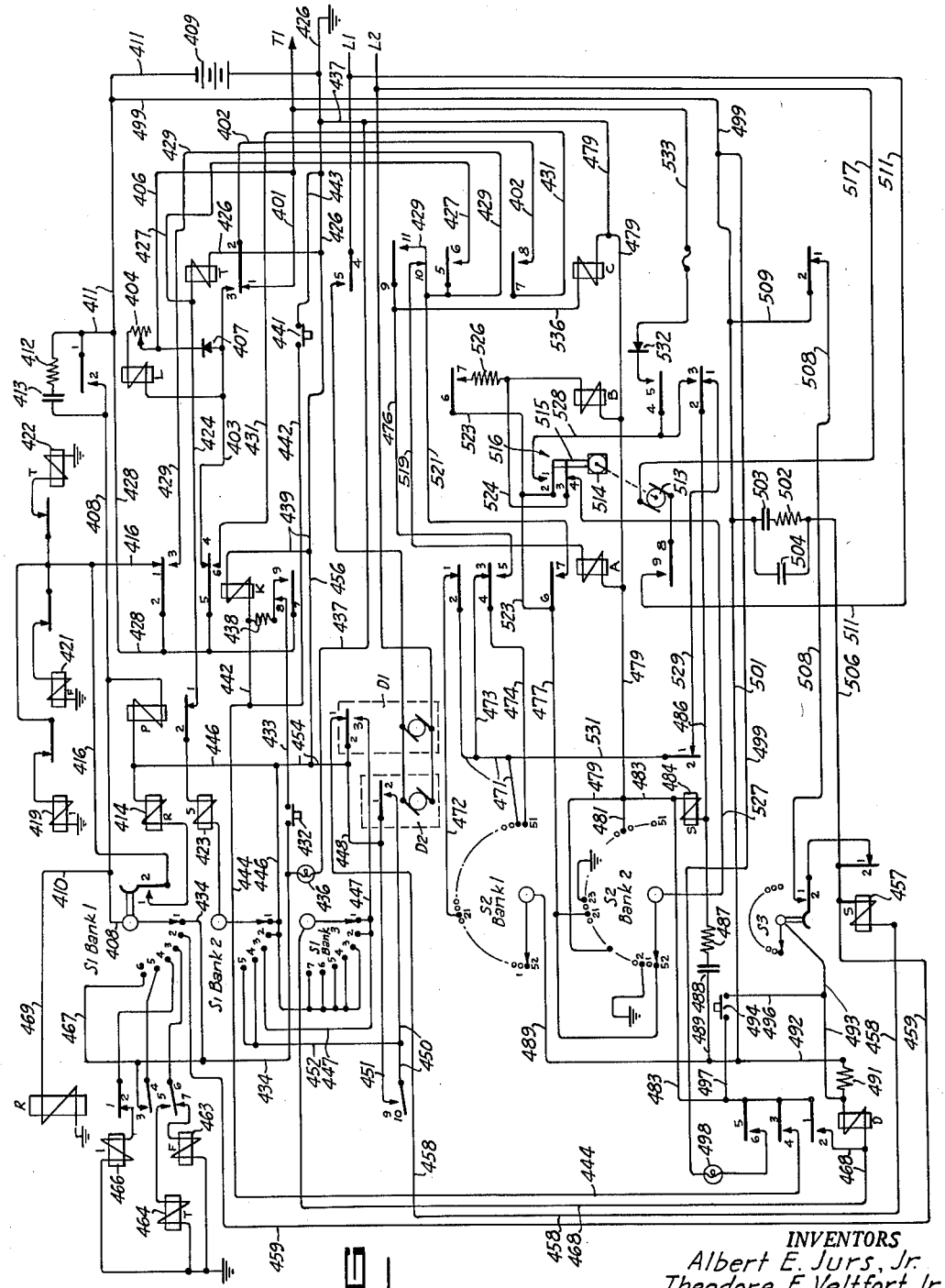
FIG_7_

United States Patent Office 3,045,488
Patented July 24, 1962

3,045,488
TELEMETERING SYSTEM AND APPARATUS
Albert E. Jurs, Jr., and Theodore E. Veltfort, Jr., Berkeley, Calif., assignors to Shand and Jurs Co., Berkeley, Calif., a corporation of California
Filed Aug. 8, 1957, Ser. No. 677,066
15 Claims. (Cl. 73—342)

This invention relates generally to a telemetering system and apparatus and more particularly to a telemetering system and apparatus for conveying temperature information.

In many industrial applications it is desirable to measure temperature at remote locations. For example, it may be desirable to ascertain the temperature of a liquid stored in a tank in a remote location. When only a single temperature measurement is required, a direct connection can be made between the remote location and the receiving station. However, where temperatures must be measured at several locations, means must be provided for selecting the remote location. By way of example, a selecting, routing and receiving system and apparatus as disclosed in co-pending application Serial Number 506,560 filed May 6, 1955, in the name of Jack S. Hawley now Patent No. 2,919,435 can be used for such a purpose.

As disclosed in the above co-pending application, selecting means is provided for selecting a predetermined remote location. A transmitter is located at the remote location for sending the desired information to receiving means at the receiving station. One such type of transmitter is disclosed in co-pending application Serial Number 342,402 filed March 16, 1953, in the names of Ellsworth A. Hosmer, Jack S. Hawley and Albert E. Jurs, Jr., now Patent No. 2,814,798. As disclosed in application Serial Number 342,402 filed March 16, 1953, now Patent No. 2,814,798 the transmitter is adapted to be placed in operation by a start pulse sent from the selecting means. The transmitter, after receiving the start pulse, commences operation and sends predetermined information such as level infomation in the form of pulses to the receiving station. One or more series of pulses can be included in this information to actuate confirming means at the receiving station to indicate whether the proper transmitter has been selected.

Where a large number of remote locations are involved, suitable apparatus such as the remote selecting apparatus disclosed in co-pending application Serial Number 506,513 filed May 6, 1955, in the name of Jack S. Hawley now Patent No. 2,877,444 can be utilized.

In general, it is an object of the present invention to provide a telemetering system and apparatus for measuring purposes.

Another object of the invention is to provide a system and apparatus of the above character for temperature measurement which is compatible with equipment presently in use.

Another object of the invention is to provide a system and apparatus of the above character which is adapted to be placed in operation by a start pulse.

Another object of the invention is to provide a system and apparatus of the above character in which the temperature information is transmitted in one or more series of pulses.

Another object of the present invention is to provide a system and apparatus of the above character in which the transmitted information includes one or more series of confirming code pulses.

Another object of the invention is to provide a system and apparatus of the above character in which the number or character of the transmitted pulses is determined by a value of resistance, the resistance having a known relationship to the variable being measured.

Another object of the invention is to provide a system and apparatus of the above character in which a single scanning potentiometer is used for measuring several unknown resistances.

Another object of the invention is to provide a system and apparatus of the above character in which the level information is furnished as a value of resistance.

Another object of the invention is to provide a system and apparatus of the above character in which the resistances to be measured are portions of Wheatstone bridges.

Another object of the invention is to provide a system and apparatus of the above character in which the number or character of pulses in any one series of pulses is determined by the travel of a scanning potentiometer from a starting position to a null position.

Another object of the invention is to provide a system and apparatus of the above character in which null is determined electronically.

Another object of the invention is to provide a system and apparatus of the above character in which pulses are sent on one side of null and are not sent on the other side of null.

Another object of the invention is to provide a system and apparatus of the above character in which any one of a plurality of Wheatstone bridges can be selected.

Another object of the invention is to provide a system and apparatus of the above character in which the Wheatstone bridges can be calibrated for zero and maximum range.

Another object of the invention is to provide a system and apparatus of the above character in which compensation may be made for the non linear characteristic of a resistance with respect to a variable being measured.

Additional objects and features of the invention will appear from the following description in which the preferred embodiment has been set forth in detail in conjunction with the accompanying drawing.

Referring to the drawing:

FIGURE 1 is a block diagram of the telemetering system and apparatus embodying the present invention.

FIGURE 2A is a circuit diagram of a portion of the present invention.

FIGURE 2B is a circuit diagram of another portion of the present invention and shows the temperature bulb selecting means.

FIGURE 2C is a circuit diagram of another portion of the invention and shows the Wheatstone bridges.

FIGURE 2D is a circuit diagram of another portion of the invention and shows the electronic null detector.

FIGURE 3 is a simplified block diagram of a single resistance bridge and the electronic null detector.

FIGURE 4 is a circuit diagram showing the Wheatstone bridges for use in connection with a temperature spot bulb.

FIGURES 5A, 5B, 5C, 5D and 5E are circuit diagrams of the Wheatstone bridges.

FIGURE 6 is a schematic diagram of a network.

FIGURE 7 is a circuit diagram of the receiving station.

The telemetering system illustrated in the block diagram of FIGURE 1 shows a typical installation and consists of a receiving or reading station 11 which may be connected to one or more remote selectors but which is shown connected to a single remote selector 12 by suitable electrical means such as a conductor 13. The remote selector is connected to one or more temperature transmitters 14 and level transmitters 15 by suitable electrical means such as conductors 16. The temperature and level transmitters are located at the remote locations at which it is desired to measure temperature. For example, the transmitters can be connected to storage tanks 17. If desired the receiving station can be connected directly to one or more temperature transmitters as shown.

The receiving station 11 may be generally of the type disclosed in copending application Serial Number 506,560 filed May 6, 1955 now Patent No. 2,919,435 with several minor modifications as hereinafter described. In copending application Serial Number 506,560 now Patent No. 2,919,435 the receiving station was described in conjunction with level information. If temperature and level readings are both required, the addition to the receiving station to accommodate temperature information consists primarily of a transfer circuit so that the channel used to confirm the selected transmitter is shared by both the level reading and the temperature systems. When temperature information is being received, the channel normally used for feet in level reading as described in copending application Serial Number 506,560 now Patent No. 2,919,435 is transferred to the temperature indicator and the channel that is used for inches in level reading is not used for temperature. In addition to this change in switching, a special indicator is provided appropriately calibrated for the temperature range to be covered. A more detailed description of the receiving station is hereinafter described in conjunction with FIGURE 7.

The remote selector 12 can be of the type disclosed in copending application Serial Number 506,513 filed May 6, 1955 now Patent No. 2,877,444.

As described in the above copending application, any suitable means can be used for connecting the receiving station 11 to the remote selector 12 and to connect the remote selector 12 to the transmitting station 14, as for example, radio in place of conductors 13 and 16.

The temperature transmitters 14 can be directly connected to the receiving station where the distances between the transmitter and the receiving station are not too great or when the expense is not prohibitive.

It is apparent that the transmitters 14 can be utilized at various locations from which it is desired to transmit information, for example, they can be located at oil tanks, gas storage tanks, dams and the like. Since it is necessary to connect each of the transmitters 14 to the remote selector, it is generally desirable to locate the remote selector 12 in a location which is closer to all of the tanks to be connected to the remote selector. In this way, the conductors 16 may be of minimum length. This makes possible a substantial saving because only one circuit is required between the receiving station 11 and the remote selector 12.

In general, the operation of one of the temperature transmitters 14 is adapted to be initiated by a start pulse sent from the receiving station. As soon as the start pulse is received, a temperature gauging cycle is commenced. When multiple temperature-resistance bulbs are used, a series of level pulses are generated, the number being determined by a liquid level transmitter of the type disclosed in copending application Serial Number 342,402 filed March 16, 1953 now Patent No. 2,814,798. This series of pulses is used for automatically selecting the proper temperature resistance bulb. If only one temperature resistance bulb is being used, this series of pulses is eliminated. One or more series of code pulses are then generated to identify the transmitter to the receiving station. One additional series of pulses is then generated, the number of pulses being determined by the value of the temperature-resistance element previously selected. This series is used for giving the temperature indication at the receiving station. After all of the series of pulses have been generated, the temperature transmitter is provided with means for returning itself to a home position in which it is adapted to be initiated by a start pulse as hereinbefore described.

As shown in the circuit diagram, and FIGURES 2A, 2B, 2C and 2D, the temperature transmitter generally consists of programming means 21 and gating means 22. The temperature transmitter also includes bulb selecting means 23, a Wheatstone bridge network 24 and an electronic null detector 26.

As shown schematically in FIGURES 2A and 2B the temperature transmitter 14 includes a three bank stepping switch S1 in which each of the banks is provided with terminals numbered 1 to 10. Bank number 1 is of the non-bridging type and banks 2 and 3 are of the bridging type. The stepping switch S1 is provided with contacts 1 to 5 and a stepping coil M having interrupter contacts 1 and 2.

The temperature transmitter also includes gating relay G having contacts 1 to 5, a switch S2 consisting of pulsing contacts 1 and 2, a fine programming switch S3 having contacts 1 and 2 and a coarse programming switch S4 having contacts 1, 2 and 3, and another stepping switch S5 having terminals 1 to 10 and contacts 1, 2 and 3. The stepping switch S5 also includes a step coil N having interrupter contacts 1 and 2.

The temperature transmitter also includes a power transformer 28 having a primary winding 28a and secondary windings 28b, 28c and 28d, terminals T1 through T12, a motor 29, a pulsing cam 31, a fine programming cam 32, a coarse programming cam 33, and a potentiometer 34. Additional terminals N1 to N8 and B1 to B10 are provided. The "N" numbered terminals are connected to the electronic null detector as shown in FIGURE 2D whereas the "B" numbered terminals are connected to the Wheatstone bridge network shown in FIGURE 2C.

A plurality of temperature-resistance elements or bulbs R1 through R10 have been provided and may be of any suitable type such as those manufactured by the Weston Electrical Instrument Corporation of Newark, New Jersey.

Terminal T1 of the temperature transmitter is connected to the remote selector 12 or directly to the receiving station in which the temperature transmitter is being used. Terminal T2 is connected to ground when a ground return is being utilized between the remote selector and the temperature transmitter, however, it can be connected to another line leading to the remote selector if desired. Terminal T3 merely represents frame ground for the temperature transmitter. Terminal T4 is the ground return for the resistance bridge network 24 and the electronic null detector 26. Terminals T5 and T6 are connected to a suitable source of power such as 117 volts A.C. 60 cycle.

Terminals T7 and T8 are connected into the circuit for motor 29 and are normally interconnected by conductor 35. Terminals T9 and T10 are adapted to be connected to a separate temperature resistance element or bulb when a single bulb is being utilized as hereinafter described. Terminals T11 and T12 are connected to an adjustable resistor device 36 which is shown in block form and which is adapted to be positioned by suitable means such as a level positioning device 37 of the type disclosed in co-pending application Serial Number 342,-402 filed March 16, 1953 now Patent No. 2,814,798.

The adjustable resistor device can be of any desired type. For example, it can consist of a plurality of resistors mounted on a disc and having their leads connected to commutator segments mounted on the disc. Wipers or sliding contacts may engage the commutator segments and be connected to terminals T11 and T12. The resistors would be positioned in accordance with the liquid level and therefore the value of resistance across the wipers could be used to indicate the level of liquid in the tank to which the level positioning device 37 is connected. This information can then be used for selecting a proper resistance-temperature bulb as hereinafter described.

Terminal T1 is connected to terminal 5 of bank 1 of switch S1 by conductor 38 and conductor 38 is connected to terminals 3 and 4 of bank 1 of switch S1 by conductors 39 and 41. The conductor 38 is also connected to one side of the upper winding for gating relay G by conductor 42 and the other side of the same winding is connected to contact 3 of the contacts for bank 1 of switch S1 by conductor 43.

Terminal T2 is connected to movable contact 2 of bank 1 of switch S1 by conductor 44. Conductor 44 is connected to movable contact 2 of switch S4 by conductor 46 and is also connected to one side of the winding 28b by conductor 47. The other side of winding 28b is connected to one side of a rectifier 48 and the other side of the rectifier is connected to one side of the winding of step coil M by conductor 49. The other side of the winding of step coil M is connected to the movable contact 2 of switch S3 by conductor 51. A filter capacitor 52 is connected between conductor 49 and conductor 47.

Terminal T4 is connected to terminal N4 by conductor 53 which provides one side of the 110 volt supply for the null detector. Terminal T5 is connected to one side of the winding 28a by conductor 54 and the other side of winding 28a is connected to one side of the motor 29 by conductor 56. The other side of the motor 29 is connected to terminal T8 by conductor 57. Terminal T6 is connected to conductor 56 by conductor 58. Terminal T7 is connected to the movable contact 5 of switch S1 by conductor 59. Terminal T9 is connected to conductor 53 and terminal T10 is connected to the wiper of stepping switch S5 by conductor 61. Terminal T11 is connected to terminal B5 by conductor 62 and terminal T12 is connected to terminal B6 by conductor 63.

Terminal 2 of bank 1 of switch S1 is connected to the stationary contact 2 of the interrupting contacts for stepping coil N by conductor 64 and the movable contact 1 of the interrupting contacts is connected to the stationary contact 1 of switch S5 by conductor 66. Terminals 2 through 10 of bank 2 of switch S1 are interconnected and are connected to stationary contact 3 of switch S5 by conductor 67. Terminal 2 of bank 3 of switch S1 is connected to conductor 63 by conductor 68 and conductors 3, 4 and 5 of the same bank are connected to terminals B2, B1 and B4 by conductors 69, 71 and 72 respectively. Terminals 6 through 10 of bank 3 are interconnected and are connected to conductor 53 by conductor 73. Terminals 1 and 11 of the same bank are also interconnected and are connected to conductor 53 by conductor 74. The wiping contact of bank 3 is connected to terminal N3 by conductor 76. The wiping contact of bank 2 is connected to the stationary contact 2 of the interrupter contacts of stepping coil M by conductor 77. Movable contact 1 of the same interrupting contacts is connected to conductor 51 by conductor 78. The wiper of bank 1 is connected to movable contact 2 of the pulsing contacts S2 by conductor 79 and stationary contact 1 of the pulsing contact is connected to terminal 11 of bank 2 of switch S1 by conductor 81.

Movable contact 1 of relay G is connected to stationary contact 4 of switch S1 by conductor 82 and conductor 82 is connected to conductor 54 by conductor 83. Stationary contact 2 of relay G is connected to conductor 59 by conductor 84. Stationary contact 3 is unused. Movable contact 4 of relay G is connected to conductor 47 by conductor 86 and stationary contact 5 of relay G is connected to conductor 81 by conductor 87.

One side of the winding 28c is connected to conductor 53 by conductor 88 and the other side of the winding is connected to terminal N5 by conductor 89. One side of the winding 28d is connected to conductor 88 and the other side of the winding is connected to terminal N7 by conductor 91. Relay G is provided with a lower winding, one side of which is connected to terminal N6 and the other side of which is connected to terminal N8 by conductors 92 and 93 respectively.

Conductor 49 is connected to one side of the winding of step coil N by conductor 94 and the other side of the winding of step coil N is connected to conductor 64.

Stationary contact 1 of switch S3 is connected to contact 1 of switch S4 by conductor 96. Stationary contact 3 of switch S4 is connected to movable contact 2 of switch S5 by conductor 97.

One side of the scanning potentiometer 34 is connected to terminal B7 and the other side is connected to terminal B8 by conductors 98 and 99 respectively. The slide or wiper for the potentiometer is connected to terminal N2 by conductor 101.

A resistor 102 and a condenser 103 are connected between conductors 46 and 51 and a resistor 104 and a condenser 106 are connected between conductor 46 and conductor 64 and serve as spark arresters for switches S3 and S4.

Terminals 1 through 10 of switch S5 are connected to one side of the resistances R1 through R10 by conductors 107 through 116. The other side of the resistances are interconnected and are connected to terminal B9 in FIGURES 2c and 4 by conductor 117. Terminal N1 is connected to frame ground. Conductor 91 is connected to terminal B10 by conductor 119.

The operation of the circuit diagram thus far described may now be given briefly as follows: Let it be assumed that the desired temperature transmitter has been selected either directly or through a remote selector as previously described and that a start pulse has been received. The start pulse will be received on terminal T1 and will momentarily energize the gating relay G. This circuit is completed from terminal T1 through conductor 38, conductor 42, the upper coil of the gating relay G, conductor 43, contacts 2 and 3 of switch S1, conductor 44 to terminal T2, the ground return. The momentary energization of relay G energizes step coil M which causes stepping switch S1 to be stepped to the number one position. The circuit is completed from the negative side of rectifier 48 through conductor 49, stepping relay coil M, conductor 51, conductor 78, interrupter contacts 1 and 2, conductor 77, the wiper of bank number 2 of switch S1, terminal 11, conductor 81, conductor 87, contacts 4 and 5 of relay G, conductor 86, conductor 47, winding 28b to the positive side of the rectifier 48.

The motor 29 is energized at the same time that the relay G is energized. This circuit is completed from 110 volt supply terminal T6 to conductor 55, motor 29, conductor 57, terminal 8, conductor 35, terminal T7, conductor 59, conductor 84, contacts 1 and 2 of relay G, conductor 82, conductor 83, conductor 54 to terminal T5 and the other side of the 110 volt supply. The motor 29 is maintained in an energized condition after the relay G is de-energized by contacts 4 and 5 of switch S1 which shunt out contacts 1 and 2 of relay G. Terminal number 1 of the stepping switch S1 is provided to insure that the motor 29 is kept running before subsequent operation is undertaken.

It will be noted that the pulsing cam 31, the programming cams 32 and 33 and the potentiometer 34 are driven in a timed relationship to each other. For example, the pulsing cam and the programming cams are geared to the motor 29 in such a manner that pulsing cam 31 takes one-half of a second for each revolution, the fine programming cam 32 takes one and one-half seconds per revolution and the coarse programming cam 33 takes twenty-four seconds per revolution. The potentiometer also takes twenty-four seconds for each revolution.

Let it be assumed that the last time the temperature transmitter was operated the cam 33 came to its home or stopping position shown in FIGURE 2A which is short of the zero position. As soon as the motor 29 is energized, cams 32 and 33 are rotated in a counterclockwise direction. When cam 33 reaches a zero position, contacts 1 and 2 of switch S4 are closed, contacts 1 and 2 of switch S3 are closed when cam follower for switch S3 drops into the notch 32a of the cam 32. Closing of both sets of contacts 1 and 2 of switches S3 and S4 causes the step switch S1 to be advanced to the number 2 position. The circuit is completed from the negative side of the rectifier 48 through conductor 49, the winding of step coil M, conductor 51, contacts 1 and 2 of switch S3, conductor 96, contacts 1 and 2 of switch S4, conductor 46, conductor 44, conductor 47, winding 28b to the positive side of the rectifier 48.

When the wiper of bank 3 of switch S1 engages terminal 2, the adjustable resistor device 36 is connected to one of the bridges in the bridge network 24 and the output of this bridge is fed into the null detector 26 as hereinafter described. The null detector then causes operation of the gating relay G (assuming that the bridge is off null) which causes contacts 4 and 5 of relay G to be closed to cause the generation of a series of pulses which cause stepping of switch S5. The circuit is completed from the rectifier 48 through conductor 49, conductor 94, step coil N, conductor 64, terminal 2 of bank 1 of switch S1, the wiper of bank 1 of switch S1, conductor 79, pulsing contacts 1 and 2 of switch S2, conductor 81, conductor 87, contacts 4 and 5 of relay G, conductor 86, conductor 47, through the winding 28b to the other side of the rectifier 48.

As explained previously, the adjustable resistor device 36 is adapted to be positioned by the level positioning device 37 in such a manner that the resistance across the terminals 11 and 12 will be proportional to the level of liquid in the tank. Since the resistance placed across the terminals 11 and 12 by the adjustable resistor device 36 is the unknown resistance or the resistance to be measured in the bridge selected from the resistance bridge network 24, it is apparent that the time it takes the potentiometer 34 to sweep from a zero position to a null position will give an indication of the value of the resistance placed across terminals 11 and 12 by the adjustable resistor device 36 which can be translated into level information.

At the time the potentiometer 34 reaches null in the bridge, the null detector 26 causes de-energization of relay G to open contacts 4 and 5 to terminate the transmission of pulses to the switch S5. In this manner, the proper resistance temperature bulb is selected by the switch S5. In general, it is desirable to select the longest temperature resistance bulb or element which is completely submerged by the liquid in the tank. The level positioning device 37 which serves to drive the variable resistor device 36 makes this possible. The series of pulses just generated give level information. The level pulses are generated in an interval of time between zero and one and one-half seconds which is the period of time required for one revolution of cam member 32. At the time the cam member 32 completes its revolution, the cam follower engages the notch 32a and causes closing of contacts 1 and 2 of switch S3. Since the contacts 1 and 2 of switch S4 are still closed, the closing of contacts 1 and 2 of switch S3 will cause advancement of the step switch S1 to the number three position in a manner similar to that hereinbefore described.

It will be noted that the terminals 2 through 10 of bank 2 of switch S1 are interconnected. The purpose of this bank of contacts is to return the temperature transmitter to its home position in the event of a power failure or in the event one of the programing cams gets out of phase with the stepping switch S1 as hereinafter described.

As soon as the switch S1 has been stepped to the number 3 position, the bridge connected to terminal 3 of bank 3 of switch S1 is connected to the null detector 26 which causes energization of gating relay G to close its contacts 4 and 5. Terminal 3 of bank 3 of switch S1 is connected to one of the bridges in the resistance bridge network 24 as hereinbefore described. The bridge connected to terminal 3 is provided with a resistance of a predetermined value which serves as the "unknown" resistance or the resistance to be measured in the bridge. The value of the resistance is chosen so that a predetermined number of pulses will be transmitted over terminals T1 and T2 to provide the first series of code pulses.

The pulses are in the form of short circuits across terminals T1 and T2 which serves to operate means at the receiving station as described in co-pending application Serial Number 506,560 filed May 6, 1955, now Patent No. 2,919,435. The circuit is completed from T1 through conductor 38, conductor 39, terminal 3 of bank 1 of switch S1, the wiper of bank 1 of switch S1, conductor 79, pulsing contacts 1 and 2 of switch S2, conductor 81, contacts 4 and 5 of relay G, conductor 86, conductor 47, conductor 44 to terminal T2.

The line closures or short circuits on terminals T1 and T2 caused by pulsing contacts 1 and 2 continue until the potentiometer 34 reaches null at which time the null detector 26 causes de-energization of relay G and opening of its contacts 4 and 5 to terminate the first series of code pulses. It is readily apparent that the value of the unknown resistance in the selected bridge can be adjusted so that any desired number of pulses can be sent out in the first series of code pulses. We have found it desirable to provide a resistor in which any number of pulses from zero to ten can be sent out in the first series of code pulses.

The first series of code pulses is transmitted during a one and one-half second interval during which time cam member 32 has had an opportunity to complete another revolution to close contacts 1 and 2 of switch S3. During this period of time cam member 33 will move from the one and one-half second reference point to the three second reference point. It will be noted that at the three second reference point contacts 1 and 2 of switch S3 are closed at the end of three seconds, switch S1 is advanced to terminal 4 in a manner similar to that previously described.

As soon as the switch S1 has been stepped to terminal 4, another bridge connected to terminal 4 is connected to the null detector 26 which, assuming that the potentiometer 34 is not at a null position, will cause energization of the gating relay G.

As hereinafter described, the bridge connected to terminal 4 includes another unknown resistance or resistance to be measured which has a predetermined value, the value being dependent upon the number of pulses desired in the second series of code pulses. Thus, in a manner similar to that described for the first series of code pulses, a second series of code pulses are transmitted over terminals T1 and T2, the number of pulses being determined by the value of the "unknown" resistance in the bridge connected to terminal 4 of bank 3 of switch S1.

It has been found desirable that the unknown resistance for the second code series be adjustable so that any number of pulses from zero to twenty pulses may be transmitted. Under the timing relationship shown for the cams in the drawing, this may take a period greater than one and one-half seconds and for that reason means is provided on cam 33 to prevent advancement of the step switch S1 at the time when the cam 32 completes its first revolution after commencement of the transmission of the second series of code pulses. Such means consists of a raised portion 33a which is provided on cam member 33 and which is engaged by the cam follower for cam member 33 at the four and one-half second interval and serves to open contacts 1 and 2 of switch S4. This opens the circuit for the stepping coil M and prevents advancement of the stepping switch S1 when the switch S3 closes at the four and one-half second interval.

All of the pulses in the second series of pulses will have been transmitted within a six second interval and for that reason a notch 33b has been provided on cam member 33 at the six second interval so that contacts 1 and 2 of switch S4 will be closed at that interval. At this time, cam member 32 will have made another revolution to cause operation of switch S3 to close its contacts 1 and 2 to cause stepping of switch S1 to the number 5 position.

At this time, the bridge connected to terminal 5 of bank 3 of switch S1 is connected to the null detector 26 to cause energization of the gating relay G and closing of its contacts 4 and 5 to commence the transmission of a series of temperature pulses. In the bridge connected to terminal 5, the resistance temperature bulb previously selected by the switch S5 is a part of the bridge and serves as the "unknown" resistance or the resistance to be measured in the bridge. Since the value of the resistance of the temperature resistance bulb bears a direct relationship to the temperature of the liquid in the tank, it is apparent that when the potentiometer 34 reaches null, a number of pulses will be transmitted which will have a direct relationship to the temperature of the liquid in the tank. The temperature pulses are transmitted over terminal 5 of bank 1 of switch S1 in a manner similar to the way in which the first and second series of coding pulses were transmitted.

Since it is generally desirable to use a greater number of pulses for conveying temperature information, a greater interval of time is required. In the embodiment of our invention shown in the drawing, the temperature pulses are trasmitted during an interval of time between the six second reference point and the twenty-two and one-half second reference point on the cam member 33. During this period of time the cam follower for cam member 33 engages a raised portion 33c on the cam member 33 which maintains contacts 1 and 2 of switch S4 in an open condition and prevents energization of the stepping coil M by the switch S3 during that period of time.

At the twenty-two and one-half second reference point the cam follower for cam 33 engages a notch 33d which causes closing of contacts 1 and 2 of switch S4. Contacts 1 and 2 of switch S3 will also be operated at this time because twenty-two and one-half is a multiple of one and one-half. At this time, step coil M is again energized to step the switch S1 to its number six position.

At twenty three seconds the cam follower for cam member 33 engages the pip 33e on cam member 33. This causes closing of contacts 2 and 3 of switch S4 and homing of the temperature transmitter. The stepping switch S5 is first returned to a home position. This circuit is completed from the negative side of rectifier 48 through conductor 49, conductor 94, step coil N, conductor 64, interrupter contacts 1 and 2, conductor 56, contacts 1 and 2 of switch S5, conductor 97, contacts 2 and 3 of switch S4, conductor 46, conductor 44, conductor 47, winding 28b, to the positive side of rectifier 48. Interrupter contacts 1 and 2 of switch S5 will be periodically opened by energization of step coil N to cause rapid stepping of the stepping switch S5 to a home position. This continues until the off-normal contacts 1 and 2 are opened when the wiper switch S5 reaches terminal 0 of switch S5.

As soon as the stepping switch S5 has returned to home position, switch S1 is returned to the home position. This circuit is completed from the negative side of rectifier 48 to conductor 49, step coil M, conductor 51, conductor 78, interrupter contacts 1 and 2 of switch S1, conductor 77, the wiper bank 2 of switch S1, terminal 6 of bank 2 of switch S1, to terminals 7, 8 and 9 and through contacts 2 and 3 of switch S5, conductor 97, contacts 2 and 3 of switch S4, conductor 46, conductor 44, conductor 47, winding 28b to the positive side of rectifier 48. The interrupter contacts 1 and 2 of switch S1 will be periodically opened to rapidly step switch S1 to a home position. When the wiper of bank 2 of switch S1 reaches terminal 11, the circuit will be broken. At the same time, contacts 4 and 5 of switch S1 will be opened to de-energize motor 29.

At this time, the temperature transmitter is in a position to be again placed in operation by a start pulse sent from the receiving station as hereinbefore described.

It is apparent from the foregoing description that the cam member 33 serves as a coarse timing cam and that the cam member 32 serves as a fine timing cam. As is also apparent from the foregoing, the timing or programming cams 32 and 33 serve to time the advancement of stepping switch S1 from one terminal to the next. Bank 1 of switch S1 in general serves to select the line over which the generated pulses are to be transmitted. Bank 2 of switch S1 is provided to insure homing of the transmitter in the event of power failure or in the event that one of the timing cams gets out of phase with the stepping switch S1. Bank 3 of switch S1 serves to select the desired bridge from the bridge network 24 and connect it to the null detector 26.

RESISTANCE BRIDGE NETWORK

As described previously, the resistance bridge network 24 is shown in FIGURE 2C and consists of a plurality of resistance bridges of the Wheatstone type. The various bridges included in the network are shown in FIGURES 5A through 5E and will be described in detail below.

A schematic diagram of the bridges shown in FIGURES 5A through 5E is shown in FIGURE 3 and consists generally of one pair of terminals 176 and 177 which are adapted to be connected to a source of alternating current 178 and a second pair of terminals 179 and 181 adapted to be connected to suitable indicating means such as the null detector 26 which is shown in block diagram form. The four impedance elements or legs of the bridge are predominantly resistive. As shown in FIGURE 3, one element or leg of the bridge consists of resistance elements $a$ and $b$ and another leg consists of resistance elements $c$ and $d$. The other two legs consist of resistance elements $x$ and $p$ and $q$ and $f$ respectively. Element $x$ represents the unknown resistance or the resistance to be measured. The potentiometer 182 formed by resistance elements $p$ and $q$ is used for zero adjustment of the bridge as hereinafter described. A variable resistance $s$ is connected between the ends of the scanning potentiometer 34 formed by resistances $b$ and $c$ serves to adjust the overall range for the bridge.

The null detector 26 into which the A.C. bridge feeds consists of an A.C. amplifier 183 which serves to amplify the sensing voltage provided by the bridge. The A.C. amplifier feeds into the phase detector 184 which is supplied with an A.C. reference voltage from the source 178. The phase detector 184 is responsive to the amplitude of the signal voltage and serves to determine on which side of null the scanning potentiometer 34 is resting. When the potentiometer 34 is on one side of null, the null detector applies a positive voltage to the D.C. amplifier 186 and causes the D.C. amplifier to operate gating relay G as hereinafter described.

The particular circuit configuration of the Wheatstone bridge network shown schematically in FIGURE 3 is provided to make possible two independent calibrations in the bridge circuit. As pointed out above, one such calibration is provided by the potentiometer 182 represented by the resistance elements $p$ and $q$ and the other calibration is provided by the variable resistor $s$. With the network shown, it is possible to adjust one calibration point without affecting the adjustment of the other calibration point. The mathematical proof establishing this fact is set forth below:

Let it be assumed that it is desirable to be able to calibrate the resistance bridge network shown in FIGURE 3 in such a manner that a fixed setting $b_0$, $c_0$ of the scanning potentiometer 34 brings the bridge into balance for a particular value of the "unknown" resistor which we will represent as $x_0$ and that this adjustment is to be made by potentiometer 182 and to remain unaffected by any setting of the variable resistor $s$.

Similarly, for a second "unknown" resistor value $x$, and a setting of $b_1$, $c_1$ for scanning potentiometer 34, the bridge must be balanced with variable resistor $s$ independently of the previous setting of potentiometer 182 represented by resistance elements $p$ and $q$.

Let the value chosen be such that $$\frac{d}{a}=\frac{c_0}{b_0}=\frac{x_0+p}{f+q}=k_0 \quad (1)$$

Assuming no current to be drawn by the null detector 26, which is obviously the case if the bridge is balanced, we may say for the current path through resistances $b$ and $c$:

$$E=(i_1+i_2)a+i_1b_0+i_1c_0+(i_1+i_2)d \quad (2)$$

and for the path through variable resistor $s$ $$E=(i_1+i_2)a+i_2s+(i_1+i_2)d \quad (3)$$

where E equals the applied voltage across the bridge $i_1$=current in $b_0$ or $c$
$i_2$=current in variable resistor $s$ The voltage between terminal 181 and ground will be $$e_{10}=(i_1+i_2)d+i_1c_0 \quad (4)$$

from (3) above:

$$(i_1+i_2)=\frac{E-i_2s}{a+d} \quad (5)$$

and subtracting (3) from (2) we have $$i_1=\frac{i_2s}{b_0+c_0} \quad (6)$$

substituting (5) and (6) in (4):

$$e_{10}=\frac{E-i_2s}{a+d}d+\frac{i_2s}{b_0+c_0}c_0$$

or $$e_{10}=\frac{d}{a+d}E+\left(\frac{c_0}{b_0+c_0}-\frac{d}{a+d}\right)i_2s \quad (7)$$

but from (1):

$$\frac{c_0}{b_0+c_0}=\frac{d}{a+d} \quad (1a)$$

therefore $$e_{10}=\frac{d}{a+d}E=\frac{c_0}{b_0+c_0}E \quad (8)$$

and is independent of an adjustment of variable resistor $s$. The voltage between terminal 179 and ground is:

$$e_{20}=\frac{x_0+p}{x_0+f+p+q}E \quad (9)$$

For balance, $$\frac{e_{10}}{E}=\frac{e_{20}}{E}=\frac{d}{a+d}=\frac{c_0}{b_0+c_0}=\frac{x_0+p}{x_0+f+p+q} \quad (10)$$

which is exactly consistent with (1) above.

In a similar manner it can be shown that for any value of $x$ such that $x \neq x_0$ for example, $x_1$, and for bridge balance:

$$\frac{e_{11}}{E}=\frac{e_{21}}{E}=\frac{d(b_1+c_1)+(c+d)s}{(a+d)(b_1+c^2)+(a+b_1+c_1+d)s}=\frac{x_1+p}{x_1+f+p+q} \quad (11)$$

so that adjustment of the value of $s$ will restore the balance for $x_1$ with out affecting balance for $x_0$.

From this mathematical proof, it is apparent that the adjustments provided by potentiometer 182 and the variable resistor $s$ are independent of each other and provide two separate calibration points. As hereinafter pointed out, the potentiometer represented by the potentiometer 182 and the circuit used for providing a zero adjustment for the bridge and the variable resistor $s$ is provided for adjusting the overall range of the bridge.

Proceeding now to the specific bridges utilized in the present invention, the entire bridge resistance network 24 will first be described. As shown in FIGURE 2C, the network consists of terminals B1 through B10 which are connected to terminals B1 through B10 in FIGURE 2A.

Terminal B1 is connected to the center tap of a potentiometer 201 by a conductor 202 and terminal B2 is connected to the centertap of potentiometer 203 by a conductor 204. Terminal B3 is connected to one side of a potentiometer 206 by a conductor 207 and the other side of the potentiometer is connected to a resistor 208 by a conductor 209 and the other side of the resistor 208 is connected to terminal B10 by conductor 211. Terminal B4 is connected to the centertap of potentiometer 206 by conductor 212 and terminal B5 is connected to the centertap of a potentiometer 213 by conductor 214. Terminal B6 is connected to one side of a resistor 216 by conductor 217 and the other side of the resistor is connected to a resistor 218 by conductor 219. The other side of the resistor 218 is connected to terminal B9 by conductor 221. Terminal B7 is connected to one side of a resistor 222 by conductor 223 and the other side of the resistor 222 is connected to one side of a potentiometer 224 by conductor 226. Terminal B8 is connected to one side of a resistor 227 by conductor 228 and the other side of resistor 227 is connected to the centertap of potentiometer 224 by conductor 229.

A resistor 231 has one side connected to conductor 223 by conductor 232 and has the other side connected to conductor 221 by conductor 233. Another resistor 234 has one side connected to conductor 229 by conductor 236 and its other side connected to conductor 211 by conductor 237. A resistor 238 has one side connected to one side of the potentiometer 213 and has the other side connected to conductor 237 by conductor 239. The other side of the potentiometer 213 is connected to one side of a resistor 241 and the other side of the resistor 241 is connected to one side of a resistor 242. The point connecting resistors 241 and 242 is connected to conductor 219 by conductor 243. The other side of resistor 242 is connected to one side of a potentiometer 244. The centertap for potentiometer 244 is connected to conductor 221 by conductor 246.

A resistor 247 has one side connected to one side of potentiometer 201 and has its other side connected to conductor 239 by conductor 248. The other side of potentiometer 201 is connected to a resistor 249 and the other side of resistor 249 is connected to one side of potentiometer 203. The other side of potentiometer 203 is connected to a resistor 251 by conductor 252 and the other side of resistor 251 is connected to conductor 221 by conductor 253. A potentiometer 254 has one side connected to conductor 252 by conductor 256. The centertap of potentiometer 254 is connected to one side of resistor 257 by a conductor 258 and the other side of resistor 257 is connected to conductor 253 by conductor 259.

The resistors and potentiometers hereinbefore described in the resistance bridge network 24 are connected in such a manner that they are adapted to provide a plurality of resistance bridges of the Wheatstone type as hereinafter described.

To facilitate explanation of the operation of the resistance bridge network 24, terminals B1 through B10 may be designated as follows: Terminal B1 may be designated as "code 2", terminal B2 as "code 1", terminal B3 as "temperature bulb" and temperature B4 as "temperature output." The terminals B5 and B6 may be designated "level" because they are adapted to be connected to the variable resistor device 36. Terminals B7 and B8 may be designated as "scanning potentiometer" because they are connected to the potentiometer 34. Terminal B9 may be designated as the "ground return" and terminal B10 may be designated as "A.C. voltage".

The operation of the resistance bridge network may now be described briefly as follows: As described previously, as soon as a start pulse is received by the temperature transmitter, the motor 29 is placed in operation and the step switch S1 is advanced from its home position to terminal number one. Shortly thereafter, step switch S1 is advanced to terminal 2 at which time a plurality of pulses are generated by the pulsing contacts S2, the number of pulses being determined by the value of the resistance placed across the terminals T11 and T12 by the variable resistor device 36. The resistance bridge utilized is connected to terminal 2 of bank 3 of switch S1 which connects the selected bridge to the null detector 26.

The bridge circuit utilized for generating the level pulses is laid out in conventional form in FIGURE 5A. The resistance placed across terminals T11 and T12 and B5 and B6 by the resistor device 36 is designated as the "unknown" resistance X.

As explained previously, the gating relay G is energized as soon as the stepping switch S1 is advanced to terminal 2 and the pulsing contacts produce pulses which actuate the stepping switch S5 to select the proper temperature-resistance bulb from the temperature resistance bulbs R1 through R10. The production of pulses and the stepping of switch S5 continues until the motor driven potentiometer 34 reaches a position in which the voltage ratio between the arms or legs on the right side of the bridge in FIGURE 5A is equal to the voltage ratio between the arms on the left side of the bridge. At the time this occurs, the null detector 26 determines this fact and causes de-energization of the relay G to prevent the production of additional pulses. In this manner, the proper temperature bulb is selected.

Potentiometers 213 and 244 are provided for adjustment purposes. Potentiometer 244 is adjusted so that a zero number of pulses are produced when the positioning device 37 is at a zero position. In making this adjustment, the shaft of the scanning potentiometer 34 is set at zero and then a known resistance which corresponds to the resistance which would be presented to terminals B5 and B6 by the resistor device 36 when the positioning device 37 is at a zero level indication is inserted between terminals B5 and B6. Potentiometer 244 is then adjusted so that the null detector 26 will cause de-energization of the gating relay G at this point to prevent the transmission of a zero number of pulses.

Potentiometer 213 is adjusted for the range. For example, in the temperature bulb select position shown in FIGURE 5A, it is adjusted to accommodate from zero to ten pulses. In making this adjustment, the shaft for scanning potentiometer 34 is moved up to its maximum advanced position, which in this case would be the position where it would have permitted the generation of ten pulses. A known resistance is placed across terminals B5 and B6, the known resistance corresponding to the resistance at the resistor device 36 when the positioning device 37 is at a maximum level indication. Potentiometer 213 is then adjusted so that the null detector causes de-energization of the relay G at this position of the potentiometer 34. As was proven mathematically above, the adjustment of the potentiometers 213 and 244 can be made independently of each other without affecting the adjustment made by either of the potentiometers. In practice it would be desirable to adjust potentiometer 213 before 244.

Some of the temperature-resistance bulbs presently available have a non linear temperature-resistance relationship such as the spot temperature bulb No. 230N manufactured by Thomas A. Edison Company. The resistance bridge shown in FIGURE 5E has been provided with a network consisting of resistors 266, 267 and 206 which compensates for this non linear relationship. To show that such a network can be provided to compensate for non linearity in resistance-temperature bulbs, the following material proof is set forth. Using approximations, the resistance of most common types of resistance-temperature bulbs can be expressed by the following equation:

$$R_x = \frac{P+pT}{Q-qT} \tag{1}$$

where $P$, $Q$, $p$ and $q$ are constants, and $R_x$ equals bulb resistance for a given temperature $T$.

It should be noted that for $Q \gg qT$, which is usually the case, relation 1 can be expressed by the square law expansion.

$$R_x \cong \frac{P}{Q} + \frac{(pQ+qP)T}{Q^2} + \frac{pq}{Q^2}T^2 \tag{1a}$$

by multiplying numerator and denominator of (1) by $Q-qT$ and dropping the negligible squared term $(qT)^2$ in the denominator.

Consider the network shown in FIGURE 6. Then $$\frac{e_0}{E} = \frac{R_2R_3+R_2R_x}{R_1R_2+R_2R_3+R_1R_3+(R_1+R_2)R_x}$$
$$= B+\beta T \tag{2}$$

where $e_0$ = output voltage
$E$ = voltage applied to network
$R_1$, $R_2$, $R_3$ are the desired compensating resistors
$R_x$ = value of resistance bulb at temperature $T$.

and $B+\beta T$ is the desired output relation linear with temperature; $B$ and $\beta$ being the desired constants.

Then, from (2):

$$\frac{e_0}{E} = \frac{R_2}{R_1+R_2}$$
$$\left(\frac{R_3}{\frac{R_1R_2+R_2R_3+R_1R_3}{R_1+R_2}+R_x} + \frac{R_x}{\frac{R_1R_2+R_2R_3+R_1R_3}{R_1+R_2}+R_x}\right)$$
$$\tag{3}$$

let $$K_a = \frac{R_2}{R_1+R_2} \text{ and } R_a = \frac{R_1R_2+R_2R_3+R_1R_3}{R_1+R_2} \tag{4}$$

then $$\frac{e_0}{E} = K_a\left(\frac{R_3}{R_a+R_x} + \frac{R_x}{R_a+R_x}\right) = B+\beta T \tag{5}$$

Solving for $R_x$:

$$R_x = \frac{(B+\beta T)R_a - R_3K_a}{K_a - B - \beta T} \tag{6}$$

or, rearranging:

$$R_x = \frac{(BR_a - R_3K_a) + \beta R_a T}{(K_a - B) - \beta T} \tag{7}$$

hwich is identically the form of (1); where $P = BR_a - R_3K_a$
$Q = K_a - B$
$p = \beta R_a$
$q = \beta$ The expression 5 above may be used to determine the parameters $R_1$, $R_2$, $R_3$ for desired output coefficients of B and β and for a given temperature bulb. Three sets of values for T and the corresponding $R_x$ inserted in the equation yield three simultaneous equations to be solved for $K_a$, $R_a$ and $R_3$; R and $R_2$ may be in turn derived from the expressions 4. The characteristics of most practical bulbs are such that a physically realizable network may be constructed for reasonable values of B and β (corresponding to the coefficients of commercially available constant temperature characteristic (bulbs), and for which the assumption of (1) holds true for a considerable range of temperature.

For example, one available temperature-resistance bulb has the characteristics shown in the table below:

Temperature T (deg. C.): Resistance R (ohms)
```
  0 ----------------------------------- 120.0
 20 ----------------------------------- 134.52
 40 ----------------------------------- 149.80
 50 ----------------------------------- 157.75
 60 ----------------------------------- 165.90
 80 ----------------------------------- 182.83
100 ----------------------------------- 200.64
```

It is desired to make the output characteristics approximate those of a linear bulb $B=.02213$ and $β=.000929$ over the range of 0° to 100° C. The three points 20°, 50° and 80° are chosen and the appropriate values used in (5) above.

Arranging in form for solution we have:
$$R_3K_a=.02213 \times 134.52+.02213R_a-134.52K_a$$
$$R_3K_a=.2485 \times 157.75+.02485R_a-157.75K_a$$
$$R_3K_a=.02756 \times 182.83+.02756R_a-182.83K_a$$

Solving:
$$R_a=472.3; \quad R_3=5.62; \quad K_a=.09582$$

or, from the relations 4 above:

$$R_1=4870.2 \text{ ohms}; \quad R_2=516.11 \text{ ohms}; \quad R_3=5.62 \text{ ohms}$$

If desired, a check on the computations and on the basic assumption of bulb characteristics may be made by using other values of T and $R_x$ from the table and calculating the departure of the output from the desired linear characteristic. It will be found, for the example given, that the maximum error (at the extremes of the temperature range) is less than .25%; well within the guaranteed accuracy of the bulb itself.

From the foregoing, it is apparent that a resistance network can be provided in the bridge 5A to compensate for non-linearity in the temperature bulbs. The possible error in calculating the resistors for the network by our method will be well within the guaranteed accuracy of the temperature bulbs.

As soon as stepping switch S5 has selected the proper temperature bulb, switch S1 is advanced to terminal 3 as hereinbefore described. Terminal number 3 of bank 3 of switch S1 serves to connect another bridge circuit to the null detector 26. This bridge circuit is shown in FIGURE 5B. The right hand arms are the same as in FIGURE 5A and for that reason have not been shown. The bridge in FIGURE 5B serves to determine the number of pulses to be sent out in the first series of code pulses. As explained previously, as soon as the bridge is connected to the null detector, pulses are sent out until the motor driven potentiometer 34 finds null at which time null detector 26 operates to de-energize the gating relay G to prevent the transmission of additional code pulses. The bridge is adjusted for zero code pulses by means of potentiometer 254 and for the desired number of pulses by adjustment of potentiometer 203. Potentiometer 254 is adjusted with the shaft of the scanning potentiometer at zero to give zero code pulses.

It is to be understood that the scanning potentiometer does not return to a physical home or zero position until the end of a complete transmitting operation. The transmission of each series of pulses takes place only over a portion of the potentiometer 34. That portion is used for finding null in the selected bridge. The next portion is used for determining the null in the next selected bridge and so forth. The largest portion of the potentiometer is used for determining the null for the temperature pulses where the greatest accuracy is required.

Potentiometer 203 can be adjusted for any suitable number of pulses for example, from one to ten pulses. When making this adjustment, the scanning potentiometer is set at the number of pulses desired and the potentiometer 203 is set to give a null indication on the null detector 26 at this point.

After the first series of coding pulses have been transmitted, stepping switch S1 is advanced to terminal 4 which connects another bridge circuit to the null detector 26. The left hand arms of this bridge are shown in FIGURE 5C. The right hand arms are identical to those shown in FIGURE 5A. Pulses are again generated until the scanning potentiometer 34 reaches null. At this time the null detector 26 causes the de-energization of relay G to terminate the transmission of the second series of code pulses. The adjustment of the bridge shown in FIGURE 5C is similar to that for the bridge shown in FIGURE 5B. Values of resistances 201, 203 and 249 are chosen such that the previous adjustment of potentiometer 254 provides for a zero number of pulses in the second group if desired. The potentiometer 201 is adjusted for the desired number of pulses to be transmitted in the second series of pulses.

After the second series of pulses have been transmitted, the stepping switch S1 is advanced to terminal 5 at which time another bridge circuit is connected to the null detector 26. As before, only the left hand arms of this bridge circuit are shown in FIGURE 5D. The bridge circuit is of the type used with constant temperature characteristic bulbs such as the Weston multiple bulbs hereinbefore described. The temperature bulb selected by switch S5 is connected to terminal B3 and constitutes the "unknown" resistance. In a manner similar to that hereinbefore described, a number of pulses are transmitted by the pulsing contacts S2. The pulses continue until the scanning potentiometer 34 establishes a null to cause de-energization of the gating relay G. The bridge is adjusted in such a manner that the number of pulses transmitted bears a direct relation to the temperature being measured.

Two basic adjustments are provided on the bridge circuit 5D. One is provided to adjust the output reading of the bridges for a low temperature reading and another adjustment is provided so that a fixed number of pulses are generated at a higher temperature reading to adjust the overall range of the bridge. In making the first adjustment, a resistor having a precision value equal to that which the temperature bulb should have at a temperature at the low end of the scale is used as the "unknown" resistor in the bridge shown in FIGURE 5D. As before, the shaft of the scanning potentiometer is set at a position which corresponds to the desired number of pulses and the potentiometer 206 is adjusted to provide null at that point. Adjustment of potentiometer 206 also serves to compensate for any line resistance between the temperature bulb and the bridge.

The same steps are taken for setting the upper adjustment. A precision value resistor of a known resistance corresponding to the second calibration point is used as the "unknown" resistance. The shaft of the potentiometer 34 is moved to a position which will give the desired number of pulses and then potentiometer 224 is adjusted to give a null for this position.

After the temperature pulses have been transmitted, the temperature transmitter returns to a home position as hereinbefore described.

The resistors and potentiometers used in the bridge network 24 may be of any suitable value. In one embodiment of our invention, the resistors and potentiometers had the following values:

*Resistors*

| | Ohms |
|---|---|
| 208 | 4000 |
| 218 | 394 |
| 222 | 120 |
| 227 | 1745 |
| 231 | 171 |
| 234 | 7360 |
| 238 | 20000 |
| 241 | 10 |
| 242 | 5 |
| 247 | 20000 |
| 249 | 10 |
| 251 | 413 |
| 257 | 5000 |

*Potentiometers*

| | |
|---|---|
| 201 | 15 |
| 203 | 15 |
| 206 | 4 |
| 213 | 4 |
| 224 | 10000 |
| 244 | 5000 |
| 254 | 5000 |

The resistance bridge network hereinbefore described is particularly adapted for use in conjunction with multiple temperature bulbs of the averaging type. However, our system and apparatus may be adapted for use with a spot bulb of the type hereinbefore described merely by changing the bridge network 24 as disclosed in FIGURE 4. Such bridge network is very similar to that disclosed in FIGURE 2C except that resistors 244, 213, 242, 218, 241, 216 and 238 have been eliminated. In their place have been substituted resistors 266, 267 and 268. Resistance 266 has one end connected to terminal B3 and has the other end connected to potentiometer 206. Resistor 266 is also connected to one side of resistor 267 and the other side of resistor 267 is connected to conductor 221. Resistor 268 is substituted for resistor 208.

Part of the resistance bridge shown in FIGURE 4 is shown in a conventional manner in FIGURE 5E. Only the left hand arms are shown. The right hand arms are identical to those shown in FIGURE 5A. The spot bulb is connected to terminal B3 and forms the "unknown" resistance.

When utilizing a spot bulb, the stepping switch S5 obviously is not required. Conductors 94, 67 and 61 are not required. Conductors 97 and 64 are connected together.

From the foregoing description of the resistance bridge network it can be seen that a system and apparatus has been provided in which the number of pulses transmitted is determined by rotation of the shaft of the potentiometer 34 from a zero to a null position. During the time interrogation is being made to determine when null has been reached, the angular position of the shaft of the potentiometer is changing and the values of the resistance on both sides of the wiping arm of the potentiometer are also changing. Thus, at a null position we have a particular shaft position or a particular output from the voltage divider which is formed by the potentiometer. It is readily apparent that instead of utilizing the shaft of the potentiometer for determining the number of pulses sent, that the shaft position or the output of the voltage divider can be used for generating signals utilizing gating procedures herein described which would be distinguishable by certain characteristics such as by their time length, e.g., a pulse group signal or which would be determined by the coincidence of the position of the potentiometer and the recognition of null in the bridge circuit.

THE NULL DETECTOR

A suitable null detector for use in our temperature transmitter which serves the same purpose as one disclosed in a co-pending application Serial Number 609,191, filed September 11, 1956, is shown in detail in FIGURE 2D and includes terminals N1 through N10. Terminals N1 to N8 are connected to terminals N1 to N8 as shown in FIGURE 2A.

The null detector illustrated employs a pair of tubes 301 and 302 which may, for example, be of the type designated by 12AX7 and 12AU7 respectively.

The tubes are of the double triode type and provide triodes VT1, VT2, VT3 and VT4. The elements of each tube include a cathode 1, a control grid 2 and a plate 3. Triode VT1 and VT2 form the A.C. amplifier 183 shown in the block diagram in FIGURE 3, VT3 serves as the phase detector 184 and VT4 serves as the D.C. amplifier 186.

The control grid 2 of the triode VT1 is connected to an input circuit which includes a transformer 303. Terminals N2 and N3 are connected in the lead from the wiper of the motor driven potentiometer 34 which, as previously explained, is a part of the bridge resistor network 24. Terminals 2 and 3 are connected to the primary of the transformer 303. The secondary of the transformer 303 is coupled to the grid 2 of triode VT1 through a limiting resistor 304. The transformer 303 serves to match the impedance between the triode VT1 and the impedance of the A.C. signal input from the selected bridge circuit. The transformer 303 also serves to isolate the input of the bridge from the ground return provided by terminal N4. Both the input terminals N2 and N3 may be at an arbitrary potential above the ground terminal N4. One side of the secondary of the transformer 303 is connected to the line 305 connected to the ground terminal N4.

High voltage A.C. is supplied to the null detector through terminal N7 and is connected to a rectifier 306 by conductor 308. The rectifier is connected to a limiting resistor 307 which is connected to terminal N8 by conductor 309. Conductor 309 may be considered the B plus supply for the null detector.

The plate 3 of triode VT1 is connected to the B plus line 309 through resistors 311 and 312. Resistor 312 serves as a decoupling resistor to prevent positive feedback from subsequent stages. A shunt capacitor 313 has one end connected between resistors 311 and 312 and has its other end connected to the ground lead 305 connected to terminal N4. A resistor 314 has one end connected between resistors 311 and 312 and the other end connected to the ground lead 305 and acts as a bleeder for the plate supply. The plate 3 of triode VT1 is coupled to the grid 2 of triode VT2 through a condenser 316 and a limiting resistor 317. The limiting resistor serves to limit the grid current which can flow during the positive portion of the incoming cycle.

A ground return for the grid 2 of triode VT2 is provided by resistor 318 which has one end connected between the resistor 317 and the condenser 316 and the other end connected to the ground lead 305. A shunting capacitor 319 has one end connected to the grid 2 of triode VT2 and the other end connected to ground lead 305 and serves to bypass higher harmonics of the 60 cycle sensing frequency which may be present because of peaking of the input transformer 303 at high signal levels.

The plate 3 of triode VT2 receives its plate voltage through resistor 321 which has one end connected to plate 3 and the other end connected to the B plus line 309. The cathodes 1 of both triodes VT1 and VT2 are connected directly to the ground lead 305.

The plate 3 of triode VT2 is coupled to the phase detector triode VT3 through a series capacitor 322 and through a limiting resistor 323. A ground return for the grid 2 of the triode VT3 is provided by a resistor 324 which has one end connected between the condenser 322 and the resistor 323 and the other end connected to the ground lead 305. A shunting capacitor 326 having one end connected to the grid 2 of triode VT3 and the other end connected to the ground lead 305 serves to bypass the harmonics of the 60 cycle sensing frequency in the same manner as shunting capacitor 319.

The plate 3 of triode VT3 receives its plate voltage through a resistor 327 having one end connected to the plate 3 and the other end connected to the conductor 308 which carries high voltage A.C. Triode section VT3 is therefore A.C. powered rather than receiving a D.C. potential as do triodes VT1 and VT2. This also means that triode section VT3 only functions as an amplifier during half of each cycle of the sensing frequency of the A.C. source. If, for example, the A.C. source is of a conventional 110 volt 60 cycle A.C., the triode will function as an amplifier only during half of each cycle of the 60 cycle sensing frequency.

The resistor 327, in addition to providing a source of A.C. potential for the plate 3 of triode VT3, provides a part of the effective load resistance between the plate and ground as far as the signal voltages are concerned.

The plate 3 of VT3 is coupled to the grid 2 of the triode VT4 through a resistance 328. Resistor 328 prevents the flow of excessive current. The plate 3 of triode VT4 is connected to terminal N6 by conductor 329. A filter capacitor 331 has one end connected to conductor 329 and the other end connected to the B plus line 309. Capacitor 331 serves to bypass or shunt the A.C. components from the amplified signal provided by triode section VT4.

Triode VT4 receives its positive potential through a high resistance winding of relay G, which is the lower winding on relay G. The circuit is completed from the positive side of the rectifier through the limiting resistor 307, conductor 309, terminal N8, conductor 93, the lower winding of relay G, conductor 92, terminal N6, conductor 329 to plate 3 of triode VT4.

The capacitor 332 is connected between the ground lead 305 and the B plus supply lead 309 and serves as a filter capacitor for the power supply furnished by the rectifier 306. A capacitor 334 and a resistance 336 are connected in parallel and are connected between terminal N1 and the ground lead 305 and serve to establish a leakage path between the ground return and the physical frame ground. It will be noted that both sides of the resistance 336 and the condenser 334 are connected to the frame ground.

Terminals N9 and N10 are test points. Terminal N9 is connected to the grid of triode VT3 by conductor 337 and terminal N10 is connected to the grid 2 of triode VT1 by conductor 338. Terminal N10 makes it possible to check the nature of the signal that is being received from the secondary of input transformer 303. Terminal N9 makes it possible to check the output from the A.C. amplifier. Thus, by terminals N9 and N10 it is possible to check the operation of the A.C. amplifier.

The operation of the null detector may now be briefly described as follows: As explained previously, the A.C. output from the selected A.C. bridge is applied to terminals N2 and N3 into the matching transformer 303. The output from the secondary of the transformer 303 is applied to the grid of the triode VT1. Triodes VT1 and VT2 are A.C. amplifiers of the grounded cathode type and operate in a manner well known to those skilled in the art to amplify the A.C. signal applied to the grid of triode VT1. The A.C. amplifiers VT1 and VT2 are also of the limiting type in that they provide the greatest gains for weak signals and a small gain for strong signals. Amplification for strong signals is limited because during positive portions of the signal the grids are driven positive to cause grid current flow. As soon as grid current begins to flow, a voltage drop occurs in the resistance 304 to provide a bias which limits the amplification of the triode. Therefore, the amplification of triode VT1 is dependent upon the signal strength during the positive portions of the A.C. signal applied to the grid 2.

There is a phase reversal between the input first triode VT1 and the input of the second triode VT2 as is well known to those skilled in the art. Thus, the negative portions of the A.C. signal applied to the grid 2 of VT1 appear to be positive portions to the grid 2 of the triode VT2. The negative portions of a strong signal serve to bias the tube of VT2 through the resistor 317 to limit the gain of that amplifier. Therefore, on strong signals, resistor 304 serves to limit the gain on the positive portions of the cycle and resistor 317 serves to limit the gain on the negative portions of the cycle. The grid resistors 304 and 317 therefore provide the proper bias to establish the desired limiting action.

As explained previously, the output from the amplifier section VT2 is applied to the grid 2 of VT3, the phase detector. The function of the phase detector is to compare this amplified A.C. signal from the selected bridge with the A.C. reference signal which comes directly from the A.C. source which furnishes the selected bridge. The reference frequency is applied directly to the plate 3 of the phase detector VT3.

Assuming that the potentiometer 34 is on one side of null and that the incoming A.C. signal from the bridge is positive at a particular instant in time, the phase detector VT3 will draw current. This is on the assumption that the A.C. reference signal applied to the plate 3 of the phase detector and the A.C. signal applied to the A.C. amplifier section of VT1 and VT2 are in phase. As soon as the phase detector draws current, a voltage drop occurs through resistance 327 and serves to reduce the voltage of the plate 3 of the phase detector below the instantaneous potential of the A.C. input source on the grid 2 of triode VT4. Triode VT4 serves to act as an amplifier. It amplifies the D.C. difference in potential between the output voltage of plate terminal 3 of VT3 and the instantaneous potential of the A.C. input. The amplifier VT4 also serves to amplify the A.C. component which is present on its grid 2. The A.C. component in the output from the D.C. amplifier VT4 is filtered out by the condenser 331 leaving only the D.C. component. The D.C. difference of potential applied to the grid 2 of the D.C. amplifier VT4 cuts off plate current to flowing through the lower winding of relay G to cause its operation to permit pulses to be transmitted over terminal T1 as hereinbefore described.

Assuming that the motor-driven potentiometer is being driven to approach null, the A.C. input signal applied to the phase detector VT3 will become weaker. This will serve to decrease the difference in D.C. potential applied to the D.C. amplifier VT4 and will gradually decrease the plate current flowing through the lower coil of relay G. Close to null the signal from the bridge may be very weak and it is necessary that this signal be amplified to a sufficient level to cause the phase detector to function properly. Sufficient gain is provided by the input transformer 303 and the triodes VT1 and VT2.

When null is reached on the bridge, the A.C. input from the bridge falls to zero and therefore the output from the A.C. amplifier is zero. This will cause the bias on the phase detector to be reduced to some intermediate value and will also cause the output from the D.C. amplifier VT4 to be of some intermediate value. However, the plate current flowing in the plate circuit of VT4 is sufficient so that the relay G is still maintained in an operative condition.

As soon as the potentiometer 34 moves past null in the bridge circuit, the phase of the A.C. signal applied to the null detector from the bridge is reversed so that it is no longer 180° out of phase with the A.C. reference signal applied to plate 3 of the phase detector. At a particular instant of time when the potential of the A.C. input from the bridge is negative, the potential on the plate 3 of the phase detector is negative and so the phase detector is non-conducting during this portion of the cycle. Therefore the voltage at the plate terminal 3 of the phase detector is negative and so the phase detector is non-conducting during this portion of the cycle. Therefore the voltage at the plate terminal 3 of the phase detector is exactly the same potential as that from the A.C. reference source.

At this time the difference in D.C. potential is zero and the current flow in the plate circuit of the D.C. amplifier is negligible which causes de-energization of relay G. It is apparent therefore that relay G will normally not be de-energized exactly at null because it takes a finite but small signal on the opposite side of null or, in other words past null, in order to have a sufficient signal applied to the phase detector to cause relay G to drop out or move to a de-energized position.

On the next half cycle before null the A.C. input from the bridge will be negative which causes a negative voltage to be applied to the grid 2 of the phase detector VT3 which prevents the triode from conducting. Thus, in this condition the voltage at the plate terminal 3 of the phase detector is exactly the same as the potential from that of the A.C. reference source. Since the D.C. difference in potential is positive, a zero voltage is applied to the grid 2 of the D.C. amplifier. Plate current will flow and relay G will be energized.

From the foregoing, it is apparent that during operation of the null detector, the phase detector is in either one of two possible conditions. In one condition, the voltage on its plate is below that of the A.C. reference potential and in the other condition the voltage on the plate is equal to the A.C. reference potential. In the first condition relay G is de-energized and in the second condition it is energized.

In the circuit diagram shown in FIGURE 4, the phasing of the bridge and the A.C. amplifier is made in such a manner that the D.C. amplifier furnishes an operating signal to relay G before null and causes relay G to drop out at the time the potentiometer 34 passes through null. However, this arrangement is purely arbitrary and could be reversed if desired.

The operation of the phase detector is particularly novel in that it gives some signal gain in addition to serving as a phase detector. The triode VT3 acts as an amplifier during the portion of the cycle in which its plate is positive. It has been found that the gain from the signal input to the signal output is approximately three or four times. The reason that the triode VT3 serves as a phase detector is that it operates as an amplifier only when the input signal is above cutoff and only when the plate is positive. It will then only act as an amplifier on one side of null and not on the other side of null because of the phase relationship between the A.C. input signal from the bridge and the reference potential as hereinbefore described.

The circuit disclosed above for the null detector is particularly advantageous. Only one triode is required for the phase detector and this triode at the same time serves as an amplifier. The half-wave phase detector requires no phase inversion means as is required with conventional balanced type phase detectors. The A.C. and D.C. amplifiers are of the grounded cathode type which serves to reduce the number of components required for the null detector.

In one embodiment of our invention, the resistors and capacitors utilized had the following values:

Resistors

| | Ohms |
|---|---|
| 304 | 47000 |
| 307 | 470 |
| 311 | 470000 |
| 312 | 100000 |
| 314 | 100000 |
| 317 | 1000000 |
| 318 | 470000 |
| 321 | 270000 |
| 323 | 1000000 |
| 324 | 1000000 |
| 327 | 100000 |
| 328 | 470000 |
| 336 | 100000 |

Capacitors

| | Microfarads |
|---|---|
| 313 | 20 |
| 316 | .022 |
| 319 | .0047 |
| 322 | .047 |
| 326 | .0022 |
| 331 | 1 |
| 332 | 20 |
| 334 | .1 |

The null detector constructed with the above resistors and capacitors gave reliable operation and was sufficiently sensitive to detect the moment when null occurred.

The temperature transmitter disclosed above has been described in conjunction with multiple temperature bulbs of the averaging type. However, the temperature transmitter is adapted for use with a spot bulb merely by changing the bridge network 24 as disclosed in FIGURE 4. The bridge network is very similar to that disclosed in FIGURE 2C except that resistors 244, 213, 242, 218, 241, 216 and 238 have been eliminated. In their place was substituted resistors 266, 267 and 268. Resistance 266 has one end connected to terminal B3 and has the other end connected to potentiometer 206. Resistor 266 is also connected to one side of resistor 267 and the other side of resistor 267 is connected to conductor 221. Resistor 268 is substituted for resistor 208.

The resistance bridge shown in FIGURE 4 is shown in a conventional manner in FIGURE 5E. Only the left hand arms are shown. The right hand arms are identical to those shown in FIGURE 5A. The spot bulb is connected to terminal B3 and forms the "unknown" resistance.

When utilizing a spot bulb, the stepping switch S5 obviously is not required. Conductors 94, 67 and 61 are not required. Conductors 97 and 64 are connected together.

RECEIVING STATION

The receiving or reading station apparatus disclosed in the circuit diagram shown in FIGURE 7 as hereinbefore briefly described consists generally of apparatus which is similar to that disclosed in copending application Serial No. 506,560 filed May 6, 1955, with minor modifications. The apparatus generally includes temperature or level selecting means and starting means which cause the transmission of one or more series of selecting pulses, the number of pulses being determined by the remote station or tank to be selected and means for sending a start pulse after completion of the transmission of selecting pulses to actuate the transmitter at the selected tank which may be a liquid level transmitter or a temperature transmitter depending upon the selection made at the reading station.

As shown, particularly in the circuit diagram in FIGURE 7, the receiving station apparatus consists of a line T1 which is normally connected to the remote selector 12 which in turn connects this line to terminal T1 as shown in the schematic diagram in FIGURE 2A of the temperature transmitter or to a similar line in a level transmitter. Terminal T1 is connected to contact 1 of relay T by conductor 401 and contact 2 of relay T is connected to contact 8 of relay C by conductor 402. Contact 3 of relay T is connected to contact 4 of relay K by conductor 403. Conductor 403 is connected to one side of the winding of relay L and the other side of the winding of relay L is connected to one end of a resistor 404. A tap on the resistor 404 is connected to conductor 401 by conductor 406. Conductor 406 is connected to one side of a rectifier 407 and the other side of the rectifier 407 is connected to conductor 403.

The wiping contact of bank 1 of switch S1 is connected to contact 2 of relay L by conductor 408 and contact 1 of relay L is connected to the negative terminal of a suitable power supply such as a battery 409 by conductor 411. The other side of the positive terminal of the battery 409 is connected to ground as shown. Conductor 408 is connected to one side of the winding of relay R by conductor 410 and the other side of the winding of relay R is connected to ground.

A spark arresting network consisting of a resistor 412 and a condenser 413 is mounted across the contacts 1 and 2 of relay L. One side of the winding of relay P is connected to conductor 408 and the other side of the winding of relay P is connected to one side of the winding for the reset coil 414. The other side of the reset coil 414 is connected to off-normal contact 1 of switch S1. Off-normal contact 2 of switch S1 is connected to contact 1 of relay K by conductor 416. Conductor 416 is connected to one of the contacts of each of the sets of contacts associated with the inch foot and temperature reset coils 419, 421 and 422, respectively. The other contact of each set of contacts is connected to the winding of each of the reset coils and the other end of the winding is connected to ground as shown.

The wiping contact of bank 2 of switch S1 is connected to one side of the stepping coil 423 for switch S1 and the other side of the stepping coil is connected to contact 2 of relay P. Contact 1 of relay P is connected to one side of the winding of relay T by conductor 424 and the other side of the winding of relay T is connected to ground by conductor 426. Conductor 424 is connected to contact 6 of relay C by conductor 427.

Contact 7 of relay K is connected to conductor 411 by conductor 428. Contacts 2 and 5 of relay K are connected to conductor 428. Contact 3 of relay K is connected to contact 11 of relay C by conductor 429. Contact 5 of relay C is connected to conductor 429. Contact 6 of relay K is connected to contact 7 of relay C by conductor 431. Contact 8 of relay K is connected to one side of the start button 432 by conductor 433 and the other side of the start button is connected to terminal 1 of bank 1 of switch S1 by conductor 434. One side of the lamp 436 is connected to conductor 434 and the other side of the lamp is connected to conductor 426 by conductor 437. Contact 9 of relay K is connected to a current limiting resistor 438 and to one side of the winding of relay K and the other side of the winding of relay K is connected to conductor 426 by conductor 439. One side of the winding of relay K is also connected to one side of the reset push button 441 by conductor 442 and the other side of the reset push button is connected to conductor 443 by conductor 443. Conductor 442 is connected to contact 4 of relay D by conductor 444.

A conductor 446 is connected between the windings of relay P and the winding of the reset coil 414 and is connected to terminals 1 and 2 of bank 2 of switch S1 and terminals 3, 4, 5, 6 and 7 of bank 3 of switch S1. A conductor 447 is connected to terminal 3 of bank 2 of switch S1 and terminals 1 and 2 of bank 3 of switch S1 and to contact 3 of a time relay device D1. Contact 2 of time delay device D1 is connected to movable contact 1 of time delay device D2 by conductor 448 and contact 2 of time delay device D2 is connected to contact 10 of relay R by conductor 459. Contact 9 of relay R is connected to conductor 448 by conductor 451. Conductor 450 is connected to terminals 4 and 5 of bank 2 of switch S1 by conductor 452.

Conductor 448 is connected to conductor 446 by conductor 454 and conductor 454 is connected to conductor 439 by conductor 456. Contact 1 of time delay device D1 is connected to one side of the step coil 457 for switch S3 by conductor 458. The other side of the step coil 457 is connected to terminal 2 of bank 1 of switch S1 by conductor 459. Terminal 3 of bank 1 of switch S1 is connected to contact 6 of relay R. Contacts 5 and 7 of relay R are connected to one side of the respective windings of the temperature indicator step coil 464 and the foot indicator step coil 463. The other sides of the windings of the coils 463 and 464 are connected to ground as shown. Terminal 4 of bank 1 of switch S1 is connected to contact 2 of relay R and contact 1 of relay R is connected to one side of the inch indicator coil 466 and the other side of the inch coil is connected to ground as shown. Terminal 6 of bank 1 of switch S1 is connected to conductor 434 by conductor 467. Conductor 467 is connected to contact 3 of relay R and contact 4 of relay R is connected to terminal 5 of bank 1 of switch S1. The wiper of bank 3 of switch S1 is connected to contact 2 of relay D by conductor 468. One side of the winding of relay R is connected to ground through an additional bank provided on the selector switch (not shown) when the selector switch is in a temperature selecting position as hereinafter described and the other side of the winding is connected to conductor 408 by conductor 469.

Terminals 1 through 20 and 22 through 50 of bank 1 of switch S2 are interconnected and are connected to contact 2 of relay A by conductor 471. Contact 1 of relay A is connected to terminal 21 of bank 1 of switch S2 by conductor 472. Contact 3 of relay A is connected to conductor 471 by conductor 473. Contact 4 of relay A is connected to terminal 51 of bank 1 of switch S2 by conductor 474. Contact 5 of relay A is connected to contact 9 of relay C by conductor 476. Contact 6 of relay A is connected to terminal 52 of bank 2 of switch S2 by conductor 477.

Terminal 2 of bank 2 of switch S2 is connected to ground as shown. This is done because, as shown in FIGURE 1, only one remote selector is being utilized. If more than one remote selector is required, the terminals 2 through 11 of bank 2 of switch S2 are connected to terminals 1 through 10 of a selector switch (not shown).

Terminals 12 through 19 of bank 2 of switch S2 are interconnected and are connected to conductor 479 which is connected to conductor 426. Terminals 23 through 42 are connected to selection terminals 11 through 30 of a selector switch (not shown) and are adapted to be grounded by the selector switch. For that reason it has been assumed that terminal 23 has been selected and grounded. As hereinbefore explained, the selector switch is provided with another bank which connects relay R to ground whenever a terminal of bank 2 of switch S2 is selected which causes the reading station to be connected to a temperature transmitter.

Terminals 43 through 50 are interconnected and are connected to conductor 479 by conductor 481. Conductor 479 is connected to contacts 1, 3 and 5 of relay D by conductor 483. One side of the step coil 484 for switch S2 is connected to conductor 483 and the other side of the step coil is connected to contact 2 of relay B by conductor 486. Conductor 486 is connected to one side of a spark arresting network consisting of a resistor 487 and a condenser 488 and the other side of the network is connected to the wiping contact of bank 1 of switch S2 by conductor 489. Conductor 489 is connected to one side of a current limiting resistor 491 by conductor 492 and the other side of the resistor is connected to one side of the winding of relay D and the other side of the winding of relay D is connected to conductor 468. One side of the resistor 491 is also connected to the wiping contact of switch S3 by conductor 493. Conductor 493 is connected to one side of an alarm reset button 494 by conductor 496 and the other side of the reset button 494 is connected to conductor 483 by conductor 497.

Contact 6 of relay D is connected to one side of a lamp 498 and the other side of the lamp 498 is connected to conductor 411 by conductor 499. Conductor 492 is connected to conductor 499 by conductor 501. Conductor 459 is connected to one side of a network consisting of a resistor 502 and a capacitor 503 and a capacitor 504 in parallel with the resistor 502 and the capacitor 503 by conductor 506. The other side of the network is connected to conductor 501. Contact 2 of the interrupting contacts for the step coil 457 is connected to conductor 506 and contact 1 of the same contacts is connected to off-normal contact 2 of switch S3. Off-normal contact 1 of switch S3 is connected to contact 1 of relay C by conductor 508 and contact 2 of relay C is connected to conductor 501 by conductor 509.

Contact 9 of relay A is connected to line L1 by conductor 511 and contact 8 of relay A is connected to one side of a motor 513 which drives a cam 514. The cam raises and lowers a member 515 which opens and closes pulsing contacts 516 comprised of contacts 1 through 4. The other side of the motor 513 is connected to line L2 by conductor 517.

Contact 10 of relay C is connected to one side of the winding of relay A by conductor 519 and the other side of the winding of relay A is connected to conductor 479. Contact 7 of relay A is connected to conductor 429 by conductor 521. Conductor 477 is connected to contact 6 of relay B by conductor 523. Contact 2 of the pulsing contacts is connected to conductor 523 and contact 3 of the pulsing contacts is connected to contact 7 of relay B by conductor 524 through a current limiting resistor 526. Conductor 524 is connected to one side of the winding of relay B and the other side of the winding of relay B is connected to conductor 479.

Contact 4 of the pulsing contacts 516 is connected to the wiping contact of bank 2 of switch S2 by conductor 527. Contact 1 of the pulsing contacts is connected to contact 3 of relay B by conductor 528. Contact 4 of relay B is also connected to conductor 528. Contact 1 of relay B is connected to interrupting contact 1 for switch S2 by conductor 529 and contact 2 of the same contacts is connected to conductor 471 by conductor 531. Contact 5 of relay B is connected to one side of a rectifier 532 and the other side of the rectifier 532 is connected to conductor 401 by a conductor 533. Conductor 476 is connected to one side of the winding of relay C by conductor 536 and the other side of the winding of relay C is connected to conductor 479.

The operation of the receiving or reading station shown in FIGURE 7 may now be briefly described as follows: Let it be assumed that the terminal T1 is connected to a remote selector 12 which is connected to level and temperature transmitters located at the remote tanks 17. Let it also be assumed that the selector switch (not shown) of the receiving station 11 which is connected to the terminals 23 through 42 of bank 2 of switch S2 has been positioned at terminal 1 to ground terminal 23. Let it also be assumed that movement of the selector switch to this position grounds one side of the winding of relay R as shown.

As described in copending application Serial No. 506,560 filed May 6, 1955, now Patent No. 2,919,435 relay L is normally energized when the receiving station is in a home or resting position, and the ready lamp 436 is lit. The circuit for energization of relay L is completed from the negative terminal of the battery 409 through conductor 411, conductor 428, contacts 4 and 5 of relay K, conductor 403, the winding of relay L, resistor 404, conductor 406 to terminal T1 to ground at the remote location.

Energization of relay L lights the ready lamp 436 through a circuit completed from the negative terminal of battery 409 through conductor 411, contacts 1 and 2 of relay L, conductor 408, the wiping contact of bank 1 of switch S1, conductor 434, ready lamp 436, conductor 437, conductor 426 to ground.

With the ready light glowing, the start button 432 may be pressed to commence the reading operation. Closing of the start button 432 causes energization of relay K. This circuit is completed from the negative terminal of battery 409 through conductor 411, contacts 1 and 2 of relay L, conductor 408, the wiping contact of bank 1 of switch S1, conductor 434, start button 432, conductor 433, contact 8 of relay K, resistor 438, the winding of relay K, conductor 439, conductor 426 to ground.

Energization of relay K establishes a holding circuit through contacts 7 and 9 of relay K. This circuit is completed from the negative terminal of battery 409 through conductor 411, conductor 428, contacts 7 and 9, resistor 438, the winding of relay K, conductor 439, conductor 426 to ground.

Closing of contacts 2 and 3 of relay K causes energization of relay A. This circuit is completed from the negative terminal of the battery 409 through conductor 411, conductor 428, contacts 2 and 3 of relay K, conductor 429, contact 10 of relay C, conductor 519, the winding of relay A, conductor 479, conductor 426 to ground.

The energization of relay A closes its contacts 8 and 9 to energize the motor 513 from the lines L1 and L2. Rotation of the motor 513 and the cam 514 causes periodic operation of the pulsing contacts.

Upon operation of the pulsing contacts, relay B is energized. This circuit is completed from the negative terminal of battery 409, conductor 411, conductor 428, contacts 2 and 3 of relay K, conductor 429, conductor 521, contacts 6 and 7 of relay A, conductor 477, terminal 52 of bank 2 of switch S2, the wiping contact of bank 2 of switch S2, conductor 527, contacts 3 and 4 of the pulsing contacts, conductor 524, the winding of relay B, conductor 479, conductor 426 to ground.

Energization of relay B causes its contacts 6 and 7 to establish a holding circuit for relay B. This is completed from contacts 6 and 7 of relay A as hereinbefore described through conductor 523, contacts 6 and 7 of relay B, resistor 526, the winding of relay B, conductor 479, conductor 426 to ground.

Closing of contacts 4 and 5 of relay B causes selecting pulses to be transmitted over the terminal T1. The circuit is again completed from contacts 6 and 7 of relay A through conductor 523, contacts 1 and 2 of the pulsing contacts, conductor 528, contacts 4 and 5 of relay B, rectifier 532, conductor 533 to terminal T1 and to ground. Thus, it is apparent that as the cam 514 rotates and contacts 1 and 2 of the pulsing contacts are periodically opened and closed, a series of pulses will be sent to the remote selector 12.

Energization of relay B causes energization of the stepping circuit for switch S2. The circuit is completed from contacts 1 and 2 of the pulsing contacts as hereinbefore described through conductor 528, contacts 2 and 3 of relay B, conductor 486, step coil 484, conductor 483, conductor 479, conductor 426 to ground.

Each time the step coil 484 is energized, the switch S2 is advanced one step. Thus, it is apparent that each time the pulsing contacts 1 and 2 are closed, the switch S2 will be advanced one step. It will be noted that the first terminal bank 2 of switch S2 is blank and that terminal 2 of bank 2 of switch S2 is connected to ground. This means that one additional pulse is provided at the beginning of the first series of selecting pulses which may be utilized for actuating auxiliary apparatus such as an interlock.

However, upon the second operation of the step coil 484 by closing of its contacts 1 and 2 which causes movement of the wiper of bank 2 of switch S2 to terminal 2, a shunt circuit is established which causes release of relay B. This shunt circuit is completed from ground through conductor 426, conductor 479, the winding of relay B, conductor 524, contacts 3 and 4 of the pulsing contacts, conductor 527, the wiping contacts of bank 2 of switch S2, terminal 2 of bank 2 of switch S2 to ground at the selector switch (not shown).

Thus, in this case only two pulses will be sent out, one pulse being used for other functions and the last pulse being used for selection purposes. It is readily apparent that if a different selected terminal was grounded by a selector switch, the wiper arm of switch S2 would be advanced until a ground is found.

As soon as relay B is de-energized, a homing circuit is established for switch S2. This circuit is completed from the negative terminal of the battery 409, conductor 499, conductor 501, conductor 492, conductor 489, the wiping contact of bank 1 of switch S2, terminal 2 of bank 1 of switch S2, conductor 471, conductor 531, interrupting contacts 1 and 2 of switch S2, conductor 529, contacts 1 and 2 of relay B, conductor 486, step coil 484, conductor 483, conductor 479, conductor 426 to ground.

This causes energization of the step coil 484. However, as soon as step coil 484 is energized, interrupting contacts 1 and 2 are opened causing de-energization of step coil 484 causing advancement of the step switch S2 to the next terminal. Deenergization of step coil 484 releases interrupting contacts 1 and 2 which again enclose the energizing circuit for step coil 484. Movement of the stepping switch S2 continues until terminal 21 is reached which de-energizes the homing circuit.

The arrival of the wiper of bank 1 of switch S2 at terminal 21 places the apparatus in a condition similar to that when the wiping contact of bank 1 of switch S2 is on terminal 52. Relay B is energized in a manner similar to that hereinbefore described except that the circuit is completed to terminal 21 through conductor 477. The holding circuit for relay B is again re-established through closing of its contacts 6 and 7. The second series of selecting pulses is then transmitted over the terminal T1 by opening and closing of the contacts 1 and 2 of the pulsing contacts in a manner similar to that hereinbefore described. As each pulse is transmitted, the switch S2 is advanced one step by the step coil 484 in a manner similar to that also hereinbefore described. Pulses are transmitted and advancement of the step switch S2 continues until a grounded terminal is located, the terminal being grounded by the selector switch (not shown). This second set of selecting pulses is utilized as described in copending application Serial No. 506,560 filed May 6, 1955, for selecting a specific transmitter connected to the remote selector. One additional pulse is sent which may be used for purposes other than selecting.

As soon as the wiping contact of bank 2 of switch S2 finds ground, a shunt circuit similar to that hereinbefore described is established which causes relay B to drop out and thus terminate the second series of selecting pulses.

Release of relay B causes switch S2 to step rapidly until terminal 51 is reached at which time relay C is energized. This circuit is completed from the negative terminal of the battery 409, conductor 499, conductor 501, conductor 492, conductor 489, the wiping contact of bank 1 of switch S2, terminal 51, bank 1 of switch S2, conductor 474, contacts 4 and 5 of relay A, conductor 476, conductor 536, the winding of relay C, conductor 479, conductor 426 to ground.

Operation of relay C establishes a holding circuit for relay C through its contacts 9 and 11. The circuit is completed from the negative terminal of the battery through conductor 411, conductor 428, contacts 2 and 3 of relay K, conductor 429, contacts 9 and 11 of relay C, conductor 536, the winding of relay C, conductor 479, conductor 426 to ground.

The opening of contacts 10 and 11 of relay C causes de-energization of relay A which causes switch S2 to be advanced to terminal 52.

The circuit for energizing the step coil 484 to cause this last step is completed from the negative terminal of the battery 409, through conductor 499, conductor 501, conductor 492, conductor 489, the wiping contact of bank 1 of switch S2, terminal 51 of bank 1 of switch S2, conductor 474, contacts 3 and 4 of relay A, conductor 473, conductor 471, conductor 531, interrupting contacts 1 and 2 of switch S2, conductor 529, contacts 1 and 2 of relay B, conductor 486, the winding of step coil 484, conductor 483, conductor 479, conductor 426 to ground.

The closing of contacts 7 and 8 of relay C causes a start pulse to be transmitted over the terminal T1. The circuit is completed from the negative terminal of the battery 409 through conductor 411, conductor 428, contacts 5 and 6 of relay K, conductor 431, contacts 7 and 8 of relay C, contacts 7 and 8, conductor 402, contacts 1 and 2 of relay T, conductor 401 to terminal T1 to ground at the selected transmitter.

At the same time that relay C is operated, relay T is energized. Relay T is of the slow-to-operate type and thus does not operate for a predetermined time after energization of relay C. The operation of relay T opens contacts 1 and 2 through which the start pulse is being transmitted and for that reason the time it takes for relay T to operate determines the length of the start pulse sent over terminal T1. The circuit for energizing relay T is completed from the negative terminal of the battery 409 through conductor 411, conductor 428, contacts 2 and 3 of relay K, conductor 429, contacts 5 and 6 of relay C, conductor 427, the winding of relay T, conductor 426 to ground.

Operation of relay T causes operation of time delay devices D1 and D2 by closing its contacts 4 and 5.

Closing of the contacts 5 and 6 of relay C also causes energization of the step coil 423 for switch S1. This circuit is completed from the negative terminal of the battery 409 through conductor 411, conductor 428, contacts 2 and 3 of relay K, conductor 429, contacts 5 and 6 of relay C, conductor 427, conductor 424, contacts 1 and 2 of relay P, winding of step coil 423, the wiping contacts of bank 2 of switch S1, terminal 1 of bank 2 of switch S1, conductor 446, conductor 454, conductor 456, conductor 439, conductor 426 to ground.

Energization of step coil 423 causes switch S1 to be advanced from terminal 1 to terminal 2. The apparatus is now in condition to receive the confirming code pulses from the selected transmitter at the remote location. As hereinbefore described, the code pulses are generated by periodically grounding the line connecting the transmitter to the receiving station. The first ground placed on the line connecting the receiving station to the transmitter causes operation of relay L. This circuit is completed from the negative terminal of the battery 409 through conductor 411, conductor 428, contacts 5 and 6 of relay K, conductor 431, contacts 7 and 8 of relay C, conductor 402, contacts 2 and 3 of relay T, conductor 403, the winding of relay L, resistor 404, conductor 406, terminal T1 to ground at the remote transmitter.

This operation of relay L causes generation of a pulse which causes advancement of step switch S3. This circuit is completed from the negative terminal of the battery 409 through conductor 411, contacts 1 and 2 of relay L, conductor 408, the wiping contact of bank 1 of switch S1, terminal 2 of bank 1 of switch S1, conductor 459, the winding of step coil 457 for switch S3, conductor 458, contacts 1 and 2 of time delay device D1, conductor 454, conductor 456, conductor 439, conductor 426 to ground.

At the same time as the step coil 457 of the switch S3 is energized, relay P is also energized. This circuit is completed from the negative terminal of the battery 409 through conductor 411, contacts 1 and 2 of relay L, conductor 408, winding of relay P, conductor 446, conductor 454, conductor 439, conductor 426 to ground.

As soon as the ground on the line T1 connected to the transmitter is terminated by the transmitter, relay L is deenergized opening its contacts 1 and 2. The next time the terminal T1 is grounded, the relay L is again operated and the step coil 457 is energized to advance switch S3 to the next position. This procedure continues until all of the confirming code pulses in the series transmitted have been received.

Only one series of confirming code pulses is transmitted because in the example herein given, only one remote selector is utilized and for that reason only the transmitter sending the pulses need be identified. However, as described in copending application Serial No. 506,560, filed May 6, 1955, now Patent No. 2,919,435 provision may be made for receiving two sets of confirming code pulses merely by adding an additional step switch and certain other minor modifications as described in the above copending application.

As hereinbefore described, the first twenty terminals of switch S3 are connected to the same terminals of the selector switch (not shown) as are terminals 23 through 42 of bank 2 of switch S2. Thus, the selection of one of the terminals 23 through 42 by the selector switch also places a ground on the corresponding terminal of switch S3.

If the proper number of confirming code pulses are received from the transmitter, the switch S3 is advanced to the terminal which is grounded by the selector switch. This prevents operation of relay D by the time delay device D1 by establishing a shunt circuit for relay D. This circuit is completed from ground through conductor 426, conductor 439, conductor 454, contacts 2 and 3 of time delay device D1, conductor 447, terminal 2 of bank 3 of switch S1, the wiping contact of bank 3 of switch S1, conductor 468, the winding of relay D, conductor 493, the wiping contact of switch S3, terminal 1 of switch S3 (assuming that only one confirming code pulse has been received and that terminal 23 of bank 2 of switch S2 has been selected) to the ground provided by the selector switch.

If the proper number of confirming code pulses is not received, relay D is energized which causes the alarm lamp 498 to be lit. The circuit for energizing relay D is completed from the negative terminal of the battery 409 through conductor 499, conductor 501, conductor 492, resistor 491, the winding of relay D, conductor 468, the wiping arm of bank 3 of switch S1, terminal 2 of bank 3 of switch S1, conductor 447, contacts 2 and 3 of time delay device D1 (time delay device D1 operates after a predetermined time interval to close contacts 2 and 3), conductor 454, conductor 439, conductor 426 to ground.

Operation of relay D causes a sequence of operations hereinafter described to return the apparatus to a home position from which the entire reading operation must be started again by operation of the start button 432.

Assuming that the proper number of confirming code pulses has been received and that a shunt circuit is established for the coil of D to prevent the operation of relay D, the following operation takes place.

Heretofore it was explained that relay P was operated as soon as the first confirming code pulse was received. Relay P is of the slow-to-release type and does not release during the time interval which occurs during the receipt of the confirming code pulses. Therefore, relay P remains in an operative condition during the time during which the confirming code pulses are received.

As soon as all of the confirming code pulses have been received, relay P releases to close its contacts 1 and 2 to operate the step coil 423 for the switch S1 to advance the switch S1 to the next terminal in a manner similar to that hereinbefore described.

After transmission of the confirming code pulses, a predetermined interval elapses and the selected temperature transmitter 14 causes the line connected to terminal T1 to be periodically grounded for a predetermined number of times as hereinbefore described to cause periodic operation of relay L. The first time relay L is operated by one of the temperature pulses, relay P is energized and so is the temperature step indicator coil 464. The temperature coil is energized through contacts 3 and 4 of relay R which is in the energized position. Each additional temperature pulse causes another energization of the temperature coil 464. Relay P does not follow the pulses and remains energized during the time the temperature pulses are being received. Energization of the step coil 464 causes operation of suitable indicating means such as described in copending application Serial No. 506,560 filed May 6, 1955, now Patent No. 2,919,435 to give a temperature reading which is determined by the number of temperature pulses received.

After a predetermined interval of time after receipt of the temperature pulses, relay P releases closing its contacts 1 and 2 to energize the step coil 423 for switch S1 to move wiping contacts of switch S1 to the next terminal.

The time delay device D1 has been provided to take care of the contingency when no temperature pulses are received when terminal 3 of bank 1 of switch S1 is connected to the stepping coil 464 or when no foot pulses are received when same terminal 3 is connected to the foot step coil 463. When no such pulses are received, relay P will not be energized and de-energized in the normal manner to advance step switch S1 to the next terminal. The time delay device D1 takes care of this contingency by closing its contacts 2 and 3 after the time during which these pulses should have been received. However, in the normal situation temperature pulses will be received and the time delay device D1 merely takes care of the contingency when no more foot pulses are received to advance the switch S1 to the next position.

As hereinbefore explained, after completion of the temperature pulses, the switch S1 is advanced to the next terminal which in this case is terminal 4. Since contacts 9 and 10 of relay R are closed to bypass the contacts of the time delay device D2, the step coil 423 for switch S1 will be de-energized to advance the step switch S1 to the next terminal which is terminal 5. The circuit for energizing step coil 423 is completed from the negative side of the battery 409 through conductor 411, conductor 428, contacts 2 and 3 of relay K, conductor 429, contacts 5 and 6 of relay C, conductor 427, conductor 424, contacts 1 and 2 of relay P, the winding of step coil 423, the wiper of bank 2 of switch S1, terminal 4 of bank 2 of switch S1, conductor 452, conductor 450, contacts 9 and 10 of relay R, conductor 451, conductor 448, conductor 454, conductor 439, conductor 426 to ground.

During the time the switch S1 of the receiving station apparatus is being advanced to terminal 5, a ground is being placed on the line T1 by the transmitter at the remote location to cause operation of relay L. Operation of relay L causes energization of the ready light 436 when switch S1 has been advanced to terminal 5. This circuit is completed from the negative terminal of the battery 409 through conductor 411, contacts 1 and 2 of relay L, conductor 408, the wiping contact of bank 1 of switch S1, terminal 5 of bank 1 of switch S1, contacts 3 and 4 of relay R, conductor 467, conductor 434, ready lamp 436, conductor 437, conductor 426 to ground.

The receiving station apparatus is now in a condition to be returned to its home position which is accomplished by operating the reset push button 441. Operation of the reset button 441 shunts the coil for relay K and causes it to release. This shunt circuits is established from ground through conductor 426, conductor 443, reset button 441, conductor 442, the winding of relay K, conductor 439, conductor 426 to ground.

Release of relay K closes its contacts 1 and 2 which causes energization of the temperature reset coil 422 and the reset coil 414 for switch S1. The circuit for energizing the temperature reset coil is completed from the negative terminal of battery 409 through conductor 411, conductor 428, contacts 1 and 2 of relay K, conductor 446, through the contacts associated with the temperature reset coil 422 to ground. As soon as the temperature indicator has been returned to the home position, the contacts associated with the temperature reset coil are opened to de-energize the coil.

The circuit for energizing the reset coil 414 for switch S1 is completed from the negative terminal of the battery 409 through conductor 411, conductor 428, contacts 1 and 2 of relay K, conductor 416, off-normal contacts 1 and 2 of switch S1, the winding of reset coil 414, conductor 446, conductor 454, conductor 456, conductor 439, conductor 426 to ground. This returns the switch S1 to its home position. In this position, the off-normal contacts 1 and 2 are opened to de-energize the reset coil 414.

The release of relay K opens contacts 2 and 3 which de-energizes relay T. De-energization of relay T removes the voltage from time delay devices D1 and D2. The time delay devices D1 and D2 are provided with means well known to those skilled in the art whereby they are reset automatically upon de-energization.

Opening of contacts 2 and 3 of relay K opens the holding circuit for relay C.

Upon release of relay C, its contacts 1 and 2 are closed to energize the step coil 457 for the switch S3 to return switch S3 to the home position. This circuit is completed from the negative terminal of the power supply through conductor 499, conductor 501, conductor 509, contacts 1 and 2 of relay C, conductor 503, off-normal contacts 1 and 2 of switch S3, interrupter contacts 1 and 2, the winding of step coil 457, conductor 458, contacts 1 and 2 of time delay device D1, conductor 454, conductor 439, conductor 426 to ground.

Upon energization of the step coil 457, the interrupter contacts 1 and 2 will be opened and the switch S3 will be advanced. Opening of the interrupter contacts 1 and 2 de-energizes the coil 457 which permits interrupter contacts 1 and 2 to be closed to re-energize the coil to cause the switch S3 to be advanced. This recurs repeatedly until the switch S3 has returned to its home position to open interrupter contacts 1 and 2 which removes the battery from coil 457.

In the event the switch S3 has advanced to an improper position, relay D will be operated which will cause an alarm condition to be indicated. The circuit for energization of relay D is completed from the negative terminal of the power supply 409 through conductor 499, conductor 501, conductor 492, resistor 491, the winding of relay D, conductor 463, the wiper of bank 3 of switch S1, through terminal 2, conductor 447, contacts 2 and 3 of time delay device D1, conductor 454, conductor 456, conductor 439, conductor 426 to ground.

If by chance the switch S1 has been advanced to an improper position such as terminals 1 and 3, the relay D will also be operated. If the switch has remained on terminal 1, it is readily apparent that an energization circuit for relay D can be traced through substantially the same circuit as if the wiper were on terminal 2. If the switch S1 has been incorrectly advanced to terminal 3, the circuit for energization of relay D is completed from the wiper of bank 3 of switch S1 through conductor 446, conductor 454, conductor 456, conductor 439, conductor 426 to ground.

Operation of relay D closes its contacts 1 and 2 which establish a holding circuit for relay D. This circuit is completed from the negative terminal of the battery 409 to conductor 499, conductor 501, conductor 492, resistor 491, the winding of relay D, contacts 1 and 2 of relay D, conductor 483, conductor 479, conductor 426 to ground.

Energization of relay D closes its contacts 5 and 6 which cause lighting of the selection alarm lamp 498. The circuit for lighting the alarm lamp is completed from the negative terminal of the battery 409 through conductor 499, lamp 498, contacts 5 and 6 of relay D, conductor 483, conductor 479, conductor 426 to ground.

Operation of relay D also establishes a shunt circuit for relay K through its contacts 3 and 4 to cause the release of relay K and the return of the apparatus to the home position in a manner hereinbefore described. The shunt circuit for relay K is established from ground through conductor 426, conductor 439, the winding of relay K, conductor 442, conductor 444, contacts 3 and 4 of relay D, conductor 483, conductor 479, conductor 426 to ground.

Even though the apparatus has been returned to the home position by release of the relay K, the start button can have no effect on the apparatus because of the shunt circuit established on relay K by contacts 3 and 4 of relay D. Therefore, before the apparatus can be placed in operation, the alarm reset button 494 must be operated to cause de-energization of relay D. The shunt circuit for relay D is established from one side of the alarm reset button 494 through conductor 497, conductor 483, contacts 1 and 2 of relay D, the winding of relay D, conductor 493, conductor 496 to the other side of the alarm reset button 494.

De-energization of the coil of relay D opens its contacts 3 and 4 which open the shunt circuit on the winding of relay K and places the operation of relay K again under the control of the start button 432. Opening of contacts 5 and 6 of relay D opens the circuit for energization of the lamp 498.

After the temperature has been read at the remote location, another selector switch (not shown) can be operated at the receiving station to select the level transmitter at that tank or a different tank. As soon as the selector switch has been moved to a position in which a level transmitter is selected, the ground is moved from relay R to release it and to close contacts 6 and 7 to the foot indicator coil 463 and contacts 1 and 2 to the inch indicator coil 466. The operation of the apparatus will be similar to that hereinbefore described for temperature pulses except that the foot pulses will be received on terminal 3 of bank 1 of switch S1 and will pass through contacts 6 and 7 of relay R to the foot indicator coil 463. After the termination of the foot pulses, the switch S1 will be advanced to the terminal 4 of bank 1 of switch S1 so that when the inch pulses are received they will be transmitted to contacts 1 and 2 of relay R and through the inch indicator coil 466.

At termination of receipt of the inch pulses, the switch S1 is energized through terminal 5 of bank 2 of switch S1 in a manner hereinbefore described. This advances the step switch S1 to terminal 6 to light the ready lamp 436 through a circuit similar to that hereinbefore described.

The apparatus is then ready to be reset by operation of reset push button 441 to place the apparatus in a home position in a manner similar to that described for temperature pulses.

It is apparent from the foregoing that the receiving station herein described is adapted for the receipt of temperature information alone or the receipt of temperature and level information. It is also readily apparent from copending application Serial No. 506,560 filed May 6, 1955, now Patent No. 2,919,435 that the receiving station shown in FIGURE 7 may be readily modified to be utilized in conjunction with a plurality of remote selectors 12 and may also be modified to receive two confirming code groups rather than one confirming code group.

It is also apparent from the foregoing that we have provided a particularly novel temperature transmitter which forms a part of the telemetering system and apparatus herein described. The temperature transmitter is of a type which is adapted to be utilized in conjunction with level transmitting apparatus.

We claim:

1. In a telemetering system of the character described adapted to indicate information at a reading station received from a transmitting station, a plurality of resistance bridges, each of said bridges being adjustable from an unbalanced to a balanced condition by movement of a common element from start positions through ranges of adjustment, null detecting means, programming means for connecting said bridges one at a time to said null detector, means for generating a signal, means commencing transmission of said signal as said common element moves from one of said start positions, means controlled by said null detecting means for terminating the transmission of said signal when said element reaches a null position corresponding to a balanced position of the bridge to which the null detecting means is connected, and means at the receiving station responsive to said signal.

2. A system as in claim 1 together with a plurality of temperature resistance bulbs, a resistor device adapted to be positioned in accordance with a condition, contact means engaging the resistor device, the value of the resistance across the contact means being determined by the position of the resistor device, means for connecting said contact means into one of said bridges to form a portion of said one bridge, selecting means connected to said temperature bulbs, said selecting means being operated by the signal created when said one bridge is connected to said null detecting means, and means for connecting the selected bulb into another of said bridges to form a portion of said last named bridge.

3. A system as in claim 2 wherein said bridges include a common potentiometer and wherein said common element is a part of the potentiometer together with means for adjusting the bridge to which the selected bulb is connected for zero and means for adjusting the range of the bridge whereby one adjustment will not affect the other adjustment in the bridge, said last named means comprising an adjustable resistor in parallel with said potentiometer.

4. A system as in claim 1 wherein said programming means includes a coarse timing cam and a fine timing cam, said cams being connected to said means for generating a signal to control the operation of said means for generating a signal.

5. A system as in claim 1 wherein at least one of said bridges is utilized for sending a confirming signal and wherein the bridge used for sending a confirming signal includes an impedance leg having a value of impedance corresponding to the confirming signal.

6. A system as in claim 1 in which the bridges are sequentially connected to the null detecting means and wherein the null positions of said bridges are determined by progressive movement of said element.

7. In a telemetering system of the character described, a reading station, a plurality of remotely located level transmitters, a plurality of remotely located temperature transmitters, a remote selector connected between said reading station and said transmitters, selecting means at the reading station for causing the generation of a plurality of selecting pulses to cause said remote selector to select the desired transmitter, means at the reading station for generating a start pulse after the selecting pulses have been generated to cause operation of the selected transmitter, each of said transmitters including means for generating confirming code pulses, means for transmitting information pulses in accordance with a variable being measured by the transmitter, means at the reading station for receiving said confirming code pulses, warning means at the reading station, means at the reading station for operating said warning means responsive to said code pulses where the incorrect transmitter has been selected by the remote selector, and means for receiving said information pulses from said selected transmitter, said last named means being selectively positioned by said first named selecting means.

8. In a telemetering system of the character described adapted to indicate information at a reading station received from a transmitting station, pulsing contacts for generating a plurality of electrical pulses, gating means for controlling the transmission of said pulses to the reading station, a plurality of resistance bridges, each of said bridges being adjustable from an unbalanced to a balanced condition by movement of a common element from start positions through progressive ranges of adjustment, null detecting means, programming means for sequentially connecting said bridges to said null detecting means, said programming means and said pulsing contacts operating in a controlled relationship, means operated by said programming means to commence the transmission of pulses at the time each of said bridges is connected to said null detecting means, and means operated by said null detecting means for causing operation of said gating means to terminate the transmission of pulses each time said element reaches a null position corresponding to a balanced condition of one of the bridges, and means at the reading station responsive to said pulses.

9. A telemetering system of the character described adapted to indicate information at a reading station received from a transmitting station, a resistance bridge of the Wheatstone type having four impedance legs connected to first and second pairs of bridge terminals, a reference source of alternating current connected to said first pair of terminals, the bridge being adjustable from an unbalanced condition to a balanced condition by movement of an element from a start position through a range of adjustment, alternating current amplifying means connected to said second set of terminals for amplifying the voltages appearing on said second set of terminals, phase detecting means connected to the output of said amplifier, means for connecting said alternating current reference source to said phase detector, said phase detector at a balanced condition of the bridge developing a direct current voltage of one polarity of an intermediate value and on one side of the balanced condition of the bridge developing a direct current voltage of the same polarity but of a value greater than said intermediate value and on the other side of the balanced condition of the bridge developing a direct current voltage of opposite polarity, said phase detecting means also serving as an amplifier, means for generating a signal in accordance with movement of said element and transmitting said signal to said reading station, and means responsive to a direct current voltage of one of said polarities for terminating said signal when said voltage of one polarity drops to substantially zero, and means at the receiving station responsive to said signal.

10. A system as in claim 9 wherein said phase detecting means consists of a single triode having plate, grid and cathode elements and associated circuitry.

11. A system as in claim 10 wherein said alternating current reference source is connected to the plate of said triode and wherein the output of said alternating current amplifying means is connected to the grid of said triode.

12. In a telemetering system of the character described adapted to indicate information at a reading station received from a transmitting station, a resistance bridge of the Wheatstone type having four impedance legs, one of the impedance legs including a resistor located at a point remote from the bridge, means for connecting the resistor into the bridge to form a part of the bridge, the bridge being adjustable from an unbalanced to a balanced condition by movement of an element from a start position through a range of adjustment, means to generate pulses in accordance with movement of said element and to transmit said pulses to said reading station, and means to terminate the generation of said pulses when said element reaches a null position corresponding to the balanced condition of said bridge and means at the reading station responsive to said signal.

13. In a telemetering system of the character described adapted to indicate information at a reading station received from a transmitting station, a resistance bridge of the Wheatstone type having four impedance legs, a plurality of resistors located at a point remote from the bridge, means for selecting one of the resistors and connecting the selected resistor into the bridge so that the selected resistor forms a part of one of the impedance legs of the bridge, the bridge being adjustable from an unbalanced to a balanced condition by movement of an element from a start position through a range of adjustment, means to generate pulses in accordance with movement of said element and to transmit said pulses to said reading station and means to terminate the generation of said pulses when said element reaches a null position corresponding to the balanced condition of said bridge and means at the reading station responsive to said signal.

14. In a telemetering system of the character described adapted to indicate information at a reading station received from a transmitting station, a resistance bridge of the Wheatstone type having four impedance legs, a plurality of resistors located at a point remote from the bridge, means for selecting one of the resistors and connecting the selected resistor to the bridge so that the selected resistor forms a part of one of the impedance legs of the bridge, the bridge including a potentiometer having an element movable from a start position through a range of adjustment whereby the bridge is adjustable from an unbalanced to a balanced condition, means to generate pulses in accordance with movement of said element and to transmit said pulses to said reading station, means to terminate the generation of said pulses when said element reaches a null position corresponding to the balanced condition of said bridge, means at the reading station responsive to said signal, means for adjusting the bridge for zero and means for adjusting the range of the bridge whereby one adjustment will not effect the other adjustment in the bridge, said last named means comprising adjustable resistance means in parallel with said potentiometer.

15. A system as in claim 14 wherein the zero adjusting means includes an additional potentiometer connected between two impedance legs of the bridge.

References Cited in the file of this patent

UNITED STATES PATENTS

| | | |
|---|---|---|
| 1,537,281 | Wunsch | May 12, 1925 |
| 2,456,499 | Fritzinger | Dec. 14, 1948 |
| 2,625,043 | Tapp et al. | Jan. 13, 1953 |
| 2,630,008 | Howe et al. | Mar. 3, 1953 |
| 2,649,715 | Goble | Aug. 25, 1953 |
| 2,689,339 | Hornfeck | Sept. 14, 1954 |
| 2,691,889 | Dion et al. | Oct. 19, 1954 |
| 2,694,928 | Jacobson | Nov. 23, 1954 |
| 2,717,370 | Piper | Sept. 6, 1955 |
| 2,753,713 | Mabey | July 10, 1956 |
| 2,799,758 | Hutchins | July 16, 1957 |